(12) United States Patent
Yun et al.

(10) Patent No.: US 12,436,571 B2
(45) Date of Patent: Oct. 7, 2025

(54) ELECTRONIC DEVICE INCLUDING REINFORCING STRUCTURE

(71) Applicant: Samsung Electronics Co., Ltd., Suwon-si (KR)

(72) Inventors: Inkuk Yun, Suwon-si (KR); Myunghoon Kwak, Suwon-si (KR); Sungho Ahn, Suwon-si (KR); Jookwan Lee, Suwon-si (KR); Jihyung Jung, Suwon-si (KR); Yangwook Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 18/155,905

(22) Filed: Jan. 18, 2023

(65) Prior Publication Data

US 2023/0185340 A1    Jun. 15, 2023

Related U.S. Application Data

(63) Continuation of application No. PCT/KR2022/016143, filed on Oct. 21, 2022.

(30) Foreign Application Priority Data

Dec. 15, 2021  (KR) .................. 10-2021-0179254
Jan. 25, 2022  (KR) .................. 10-2022-0010526

(51) Int. Cl.
*G06F 1/16* (2006.01)
*H04M 1/02* (2006.01)

(52) U.S. Cl.
CPC ........ *G06F 1/1652* (2013.01); *H04M 1/0268* (2013.01); *G06F 1/1624* (2013.01)

(58) Field of Classification Search
CPC ..... G06F 1/1652; H04M 1/0268; G09F 9/301
See application file for complete search history.

(56) References Cited

U.S. PATENT DOCUMENTS 9,176,535 B2 * 11/2015 Bohn .................... G06F 1/1681
10,770,678 B2    9/2020 Hu
(Continued)

FOREIGN PATENT DOCUMENTS

CN    112863338 A     5/2021
EP    3842895 A1 *   6/2021    .......... H04M 1/0268
(Continued)

OTHER PUBLICATIONS

European Search Report dated Jan. 20, 2025, issued in European Application No. 22907668.2.
(Continued)

*Primary Examiner* — Nidhi Thaker
(74) *Attorney, Agent, or Firm* — Jefferson IP Law, LLP

(57) ABSTRACT

An electronic device including a reinforcing structure is provided. The electronic device includes a first housing, a second housing movable relative to the first housing, a flexible display supported by at least one of the first housing or the second housing, and a reinforcing structure disposed on a rear surface of the flexible display, wherein the flexible display may include a rolling portion that is at least partially bent in a process of changing from the first state to the second state, and the reinforcing structure may include a support coupled to the flexible display so as to cover a rear surface of the rolling portion.

18 Claims, 15 Drawing Sheets

(56) References Cited

U.S. PATENT DOCUMENTS

| | | | |
|---|---|---|---|
| 10,798,831 B2* | 10/2020 | Shin | H05K 5/0217 |
| 11,003,219 B1* | 5/2021 | Kim | G06F 1/1652 |
| 11,199,876 B2* | 12/2021 | Lee | H04M 1/0237 |
| 12,156,350 B2* | 11/2024 | Park | G09F 9/301 |
| 2018/0124931 A1* | 5/2018 | Choi | H05K 5/0217 |
| 2019/0025945 A1* | 1/2019 | Lindblad | G06F 3/0412 |
| 2021/0149448 A1* | 5/2021 | Cao | G06F 1/1652 |
| 2021/0165454 A1* | 6/2021 | Dong | G06F 1/1652 |
| 2021/0200273 A1* | 7/2021 | Hong | H04M 1/0268 |
| 2022/0272852 A1 | 8/2022 | Park et al. | |
| 2022/0399521 A1* | 12/2022 | Kang | B32B 15/20 |
| 2023/0205272 A1* | 6/2023 | Park | G06F 1/1652 |
| | | | 361/679.01 |

FOREIGN PATENT DOCUMENTS

| | | | | |
|---|---|---|---|---|
| KR | 10-2011-0039217 A | | 4/2011 | |
| KR | 20110039217 A * | | 4/2011 | H04M 1/0268 |
| KR | 10-2019-0003257 A | | 1/2019 | |
| KR | 10-2019-0025799 A | | 3/2019 | |
| KR | 10-2019-0049242 | | 5/2019 | |
| KR | 10-2019-0062855 | | 6/2019 | |
| KR | 10-1995045 B1 | | 7/2019 | |
| KR | 10-2020-0108754 A | | 9/2020 | |
| KR | 10-2183884 B1 | | 11/2020 | |
| KR | 10-2262991 B1 | | 6/2021 | |
| KR | 10-2021-0119242 A | | 10/2021 | |
| WO | WO-2021020619 A1 * | | 2/2021 | G06F 1/1637 |
| WO | 2022/014904 A1 | | 1/2022 | |

OTHER PUBLICATIONS

International Search Report dated Jan. 30, 2023, issued in International Application No. PCT/KR2022/016143.

* cited by examiner

ELECTRONIC DEVICE INCLUDING REINFORCING STRUCTURE

CROSS-REFERENCE TO RELATED APPLICATION(S)

This application is a continuation application, claiming priority under § 365(c), of an International Application No. PCT/KR2022/016143, filed on Oct. 21, 2022, which is based on and claims the benefit of a Korean patent application number 10-2021-0179254, filed on Dec. 15, 2021, in the Korean Intellectual Property Office, and of a Korean patent application number 10-2022-0010526, filed on Jan. 25, 2022, in the Korean Intellectual Property Office, the disclosure of each of which is incorporated by reference herein in its entirety.

BACKGROUND

1. Field

The disclosure relates to an electronic device.

2. Description of Related Art

Electronic devices are gradually becoming slimmer and are being developed in various ways to strengthen design aspects and differentiate functional elements at the same time. Electronic devices are being transformed from a uniform rectangular shape into a variety of shapes. Research on electronic devices has been conducted to implement a deformable structure that is easy to carry and enables the use of a large-screen display.

According to an example of an electronic device, a display may be positioned on a plurality of housings and folded and unfolded while the plurality of housings form an angle. According to another example of an electronic device, one housing may move relative to another housing such that a screen display area of the display may be expanded.

The above information is presented as background information only to assist with an understanding of the disclosure. No determination has been made, and no assertion is made, as to whether any of the above might be applicable as prior art with regard to the disclosure.

SUMMARY

For an electronic device including a display that slides so that the area visually exposed to the outside changes according to an operation of a housing, various types of reinforcing structures for reinforcing the flexible display may be used to enhance the durability of the display that changes in shape.

Aspects of the disclosure are to address at least the above-mentioned problems and/or disadvantages and to provide at least the advantages described below. Accordingly, an aspect of the disclosure is to provide a reinforcing structure which disposed on a rear surface of a flexible display to reduce bending of the flexible display caused by an external force or external impact.

Additional aspects will be set forth in part in the description which follows and, in part, will be apparent from the description, or may be learned by practice of the presented embodiments.

In accordance with an aspect of the disclosure, a reinforcing structure disposed on a rear surface of a flexible display is provided not to interfere with the rolling of the flexible display.

In accordance with one aspect of the disclosure, an electronic device is provided. The electronic device includes a first housing, a second housing movable relative to the first housing, a flexible display supported by at least one of the first housing or the second housing, and configured to change between a first state in which an area of a display area visually exposed to an outside to face a front surface according to a relative movement of the first housing and the second housing is at a minimum and a second state in which the area of the display area is at a maximum, and a reinforcing structure disposed on a rear surface of the flexible display 420, wherein the flexible display may include a rolling portion that is at least partially bent in a process of changing from the first state to the second state. The reinforcing structure may include a support coupled to the flexible display 420 so as to cover a rear surface of the rolling portion, and including an uneven surface having a plurality of uneven areas, and a plurality of reinforcing members 432 connected to the support so that at least a portion thereof is positioned in recesses formed on the uneven surface. The rolling portion may include a portion in which the flexible display 420 is bent.

In accordance with one aspect of the disclosure, a reinforcing structure is provided. The reinforcing structure 430 includes a support connected to a flexible display so as to cover a rear surface of the flexible display and including an uneven surface having a plurality of uneven areas disposed on at least a portion of a surface opposite to the flexible display, and a plurality of reinforcing members connected to the support so that at least a portion thereof is positioned in recesses formed on the uneven surface.

In accordance with one aspect of the disclosure, an electronic device is provided. The electronic device includes a first housing, a second housing partially movably connected to the first housing in a moving direction, a flexible display supported by the first housing 312 and the second housing, and configured to change between a first state in which an area of a display area visually exposed to an outside according to a relative movement of the first housing and the second housing is at a minimum and a second state in which the area of the display area is at a maximum, and a reinforcing structure disposed on a rear surface of the flexible display. The flexible display includes a rolling portion of which the surface curvature changes in a process of changing from the first state to the second state. The reinforcing structure includes a support connected to the flexible display so as to cover a rear surface of the rolling portion, and including an uneven surface having a plurality of uneven areas disposed on a surface opposite to the rolling portion, a plurality of reinforcing members connected to the support so that at least a portion thereof is positioned in recesses formed on the uneven surface, and compression members connected to the reinforcing members so as to be positioned in the recesses. The support includes a first supporting member including a first support surface facing the rear surface of the flexible display and a second support surface opposite to the first support surface, and a plurality of second supporting members connected to the first supporting member so as to protrude in a direction of the second support surface and form the plurality of uneven areas. The second supporting members may overlap the rolling portion while the surface of the flexible display is viewed.

According to various embodiments, disposing a reinforcing structure on a rear surface of a flexible display may enhance the durability of the flexible display.

According to various embodiments, a reinforcing structure may be easily manufactured.

According to various embodiments, a reinforcing structure may be easily secured to a flexible display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
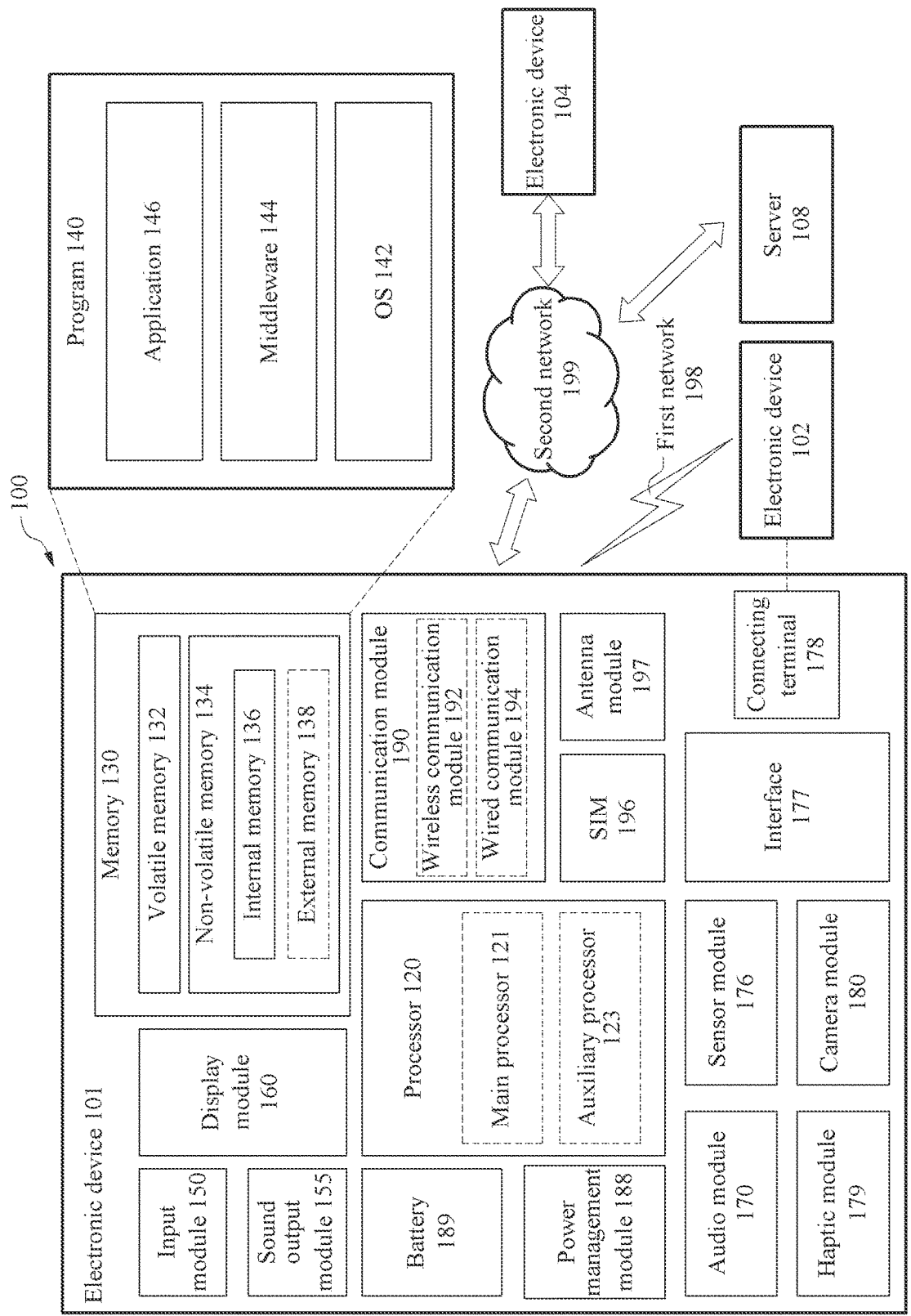
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector.

According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). according to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to an embodiment, the antenna module 197 may form a mmWave antenna module. according to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
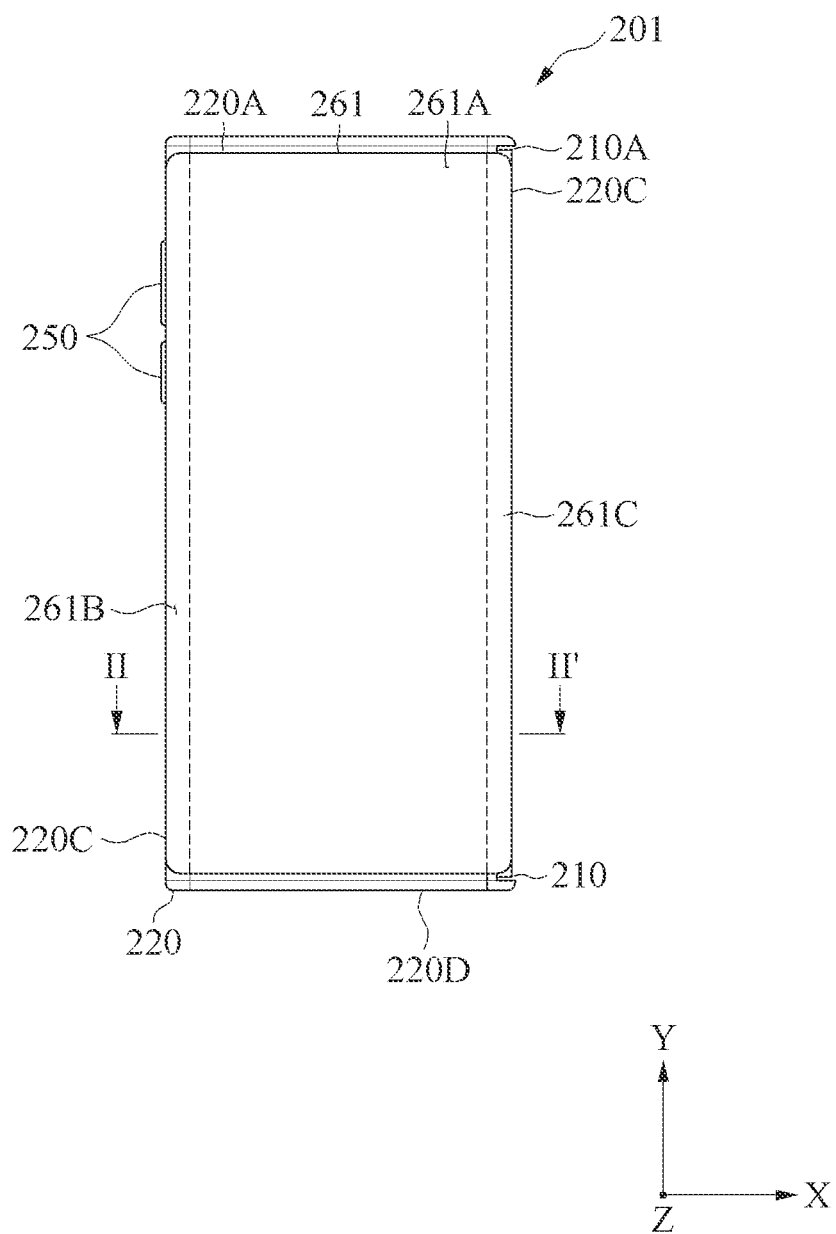
FIG. 2A is a front view of an electronic device according to an embodiment of the disclosure.
Figure 2B:
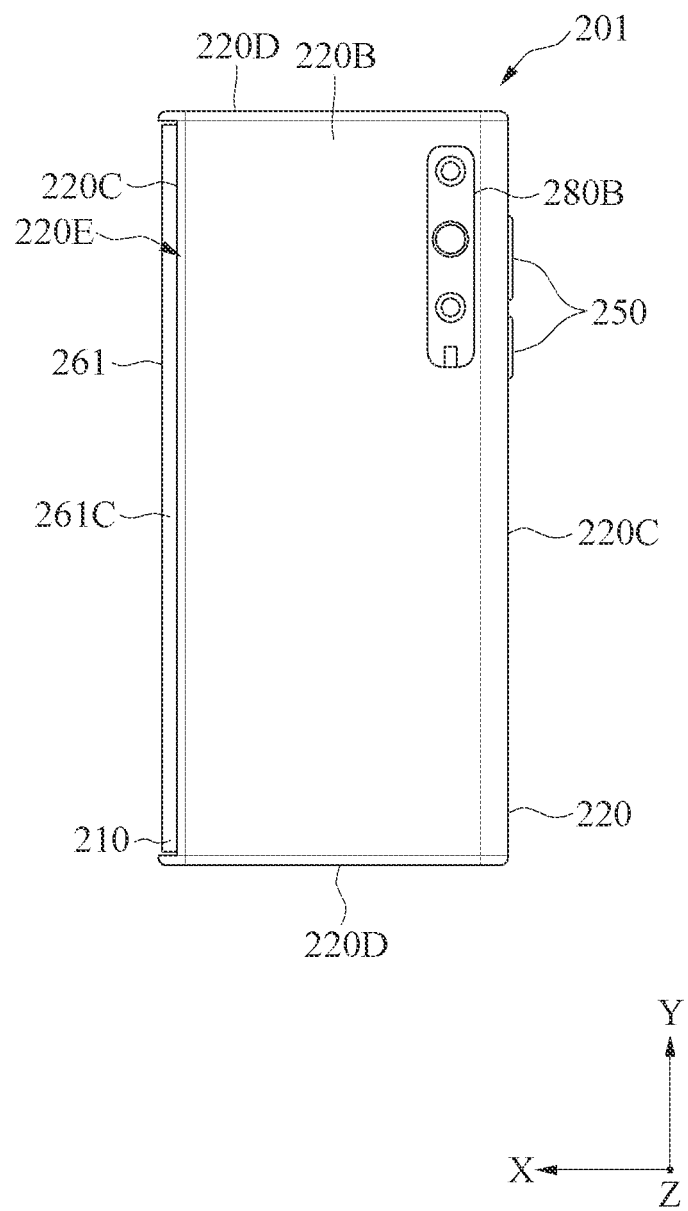
FIG. 2B is a rear view of an electronic device according to an embodiment of the disclosure.
Figure 2C:
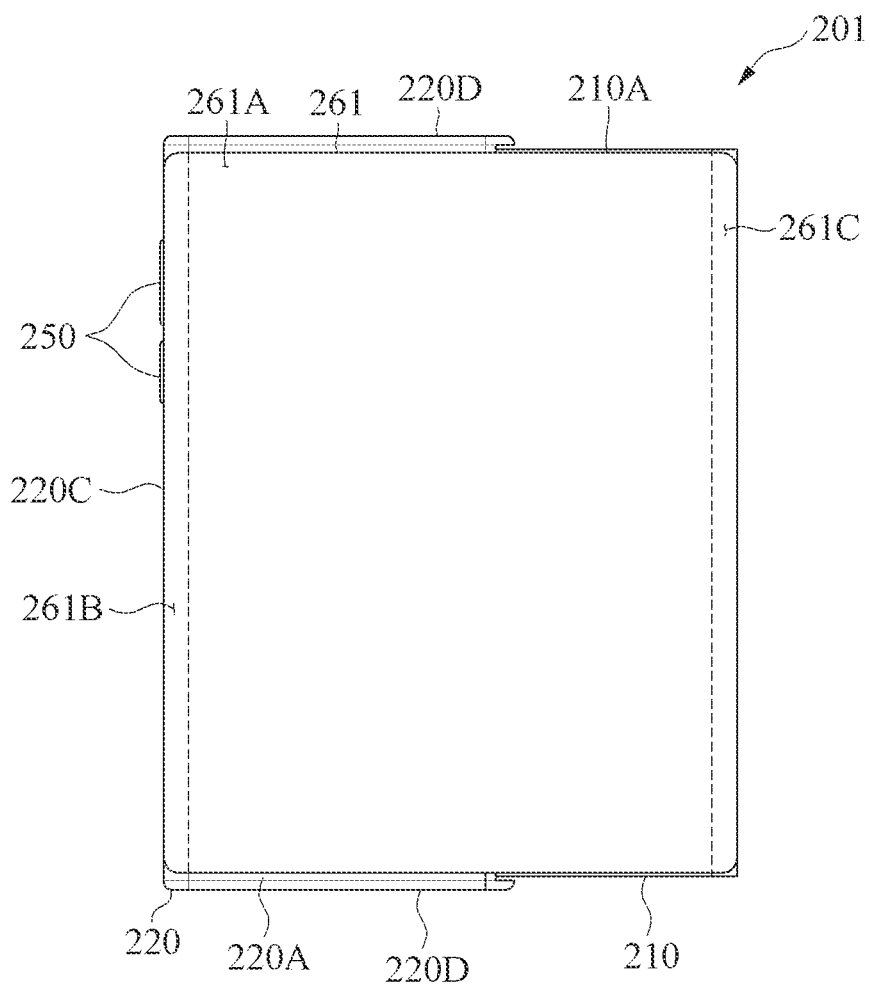
FIG. 2C is a front view of an electronic device according to an embodiment of the disclosure.
Figure 2D:
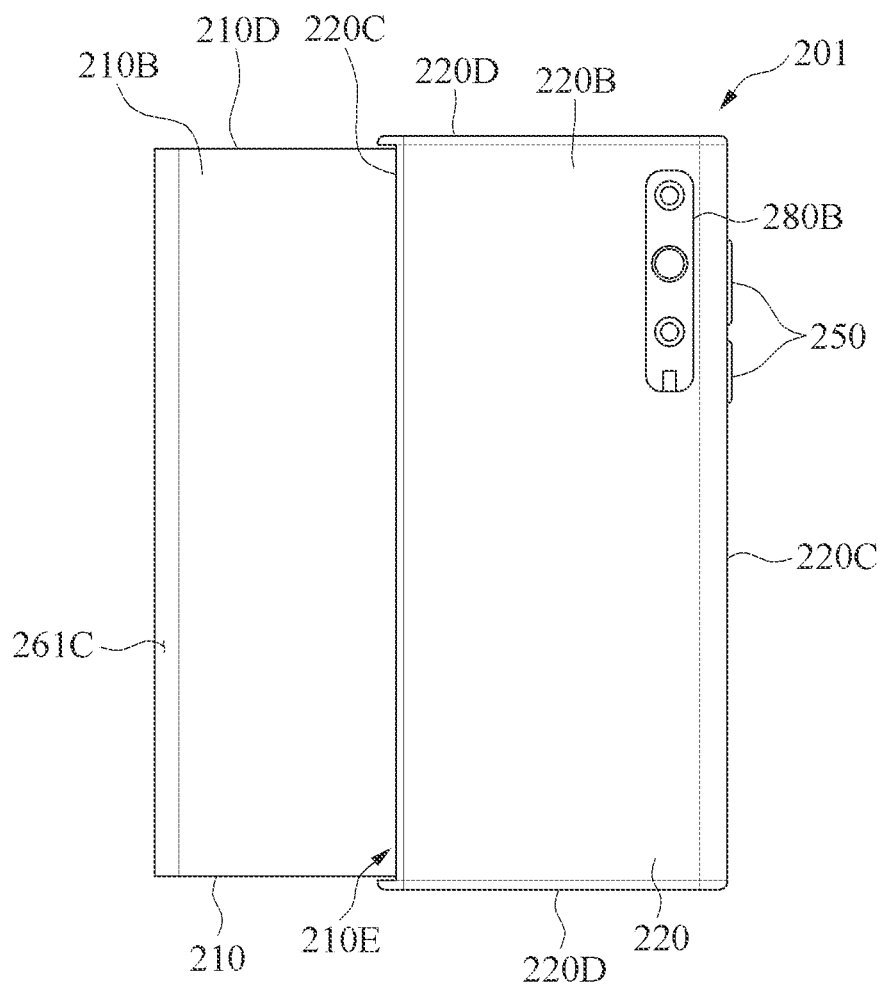
FIG. 2D is a rear view of an electronic device according to an embodiment of the disclosure.
Figure 2E:
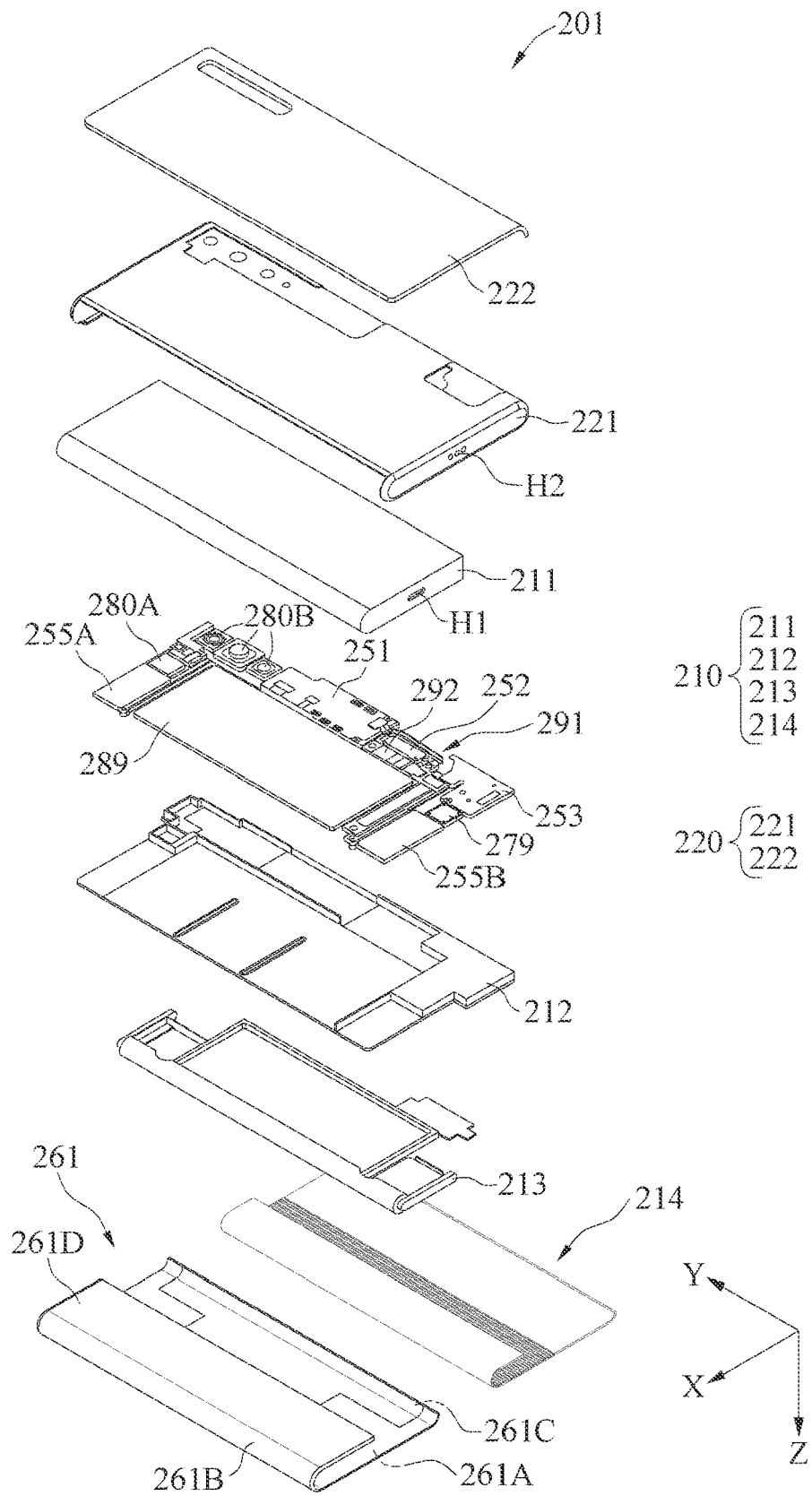
FIG. 2E is an exploded perspective view of an electronic device according to an embodiment of the disclosure.

FIG. 2A is a front view of an electronic device according to an embodiment of the disclosure, FIG. 2B is a rear view of the electronic device according to an embodiment of the disclosure, FIG. 2C is a front view of the electronic device according to an embodiment of the disclosure, FIG. 2D is a rear view of the electronic device according to an embodiment of the disclosure, and FIG. 2E is an exploded perspective view of the electronic device according to an embodiment of the disclosure.

FIGS. 2A and 2B are views when the electronic device is in a "reduced state" and FIGS. 2C and 2D are views when the electronic device is in an "expanded state".

Referring to FIGS. 2A to 2E, an electronic device 201 (e.g., the electronic device 101 of FIG. 1) may include a first housing 210 and a second housing 220 configured to form an exterior and accommodate a component inside. The first housing 210 and the second housing 220 may be movably coupled to each other.

In one embodiment, the first housing 210 may be coupled to the second housing 220 to slide relative to the second housing 220. The first housing 210 may be configured to move relative to the second housing 220 in a first direction (e.g., a +X direction) or to move relative to the second housing 220 in a second direction (e.g., a −X direction) opposite the first direction. Various embodiments of the disclosure describe that the first housing 210 moves relative to the second housing 220, but are not limited thereto, and it may also be construed that the second housing 220 slides relative to the first housing 210.

In one embodiment, the first housing 210 may include a first surface 210A (e.g., a first front surface), a second surface 210B (e.g., a first rear surface) opposite to the first surface 210A, a plurality (e.g., two) of first side surfaces 210C (e.g., a first left side surface and a first right side surface) oriented in a direction (e.g., the +/−X direction) and positioned between the first surface 210A and the second surface 210B, and a plurality (e.g., two) of second side surfaces 210D (e.g., a first upper side surface and a first lower side surface) oriented in another direction (e.g., the +/−Y direction) intersecting with the direction (e.g., the +/−X direction) and positioned between the first surface 210A and the second surface 210B. In one embodiment, the plurality of first side surfaces 210C may be formed of rounded surfaces. In one embodiment, the first housing 210 may include at least one first hole H1 formed on a second side surface 210D (e.g., the first lower side surface) oriented in one direction (e.g., the −Y direction), of the second side surfaces 210D.

In one embodiment, the second housing 220 may include a third surface 220A (e.g., a second front surface), a fourth surface 220B (e.g., a second rear surface) opposite to the third surface 220A, a plurality (e.g., two) of third side surfaces 220C (e.g., a second left side surface and a second right side surface) oriented in a direction (e.g., the +/−X direction) and positioned between the third surface 220A and the fourth surface 220B, and a plurality (e.g., two) of fourth side surfaces 220D (e.g., a second upper side surface and a second lower side surface) oriented in another direction (e.g., the +/−Y direction) intersecting with the direction (e.g., the +/−X direction) and positioned between the third surface 220A and the fourth surface 220B. Of the plurality of third side surfaces 220C, a third side surface 220C oriented in one direction (e.g., the +X direction) may include an open portion 220E that is at least partially open. In an embodiment, the plurality of third side surfaces 220C may be formed of rounded surfaces. The second housing 220 may include at least one second hole H2 formed on the fourth side surface 220D (e.g., the second lower side surface) oriented in a direction (e.g., the −Y direction) among the plurality of fourth side surfaces 220D. The second hole H2 may be aligned, for example, with the first hole H1.

In one embodiment, the electronic device 201 may include a display 261 (e.g., the display module 160 of FIG. 1) including screen display areas 261A, 261B, 261C, and 261D. In one embodiment, the display 261 may be any of a flexible display, a foldable display, or a rollable display.

In one embodiment, the screen display areas 261A, 261B, 261C, and 261D may include a first area 261A on the first surface 210A and the third surface 220A, a second area 261B on the third side surface 220C oriented in a direction (e.g., the −X direction) among the third side surfaces 220C, a third area 261C on the third side surface 220C oriented in another direction (e.g., the +X direction) among the third side surfaces 220C and at least partially enclosing the open portion 220E, and a fourth area 261D on the second surface 210B and the fourth surface 220B.

In one embodiment, the second area 261B and the third area 261C of the display 261 may have flexibly curved round surfaces. In one embodiment, the second area 261B may be partially on the first surface 210A and the third surface 220A. In one embodiment, the third area 261C may be partially on the first surface 210A and the third surface 220A. In one embodiment, the third area 261C may be partially on the second surface 210B and the fourth surface 220B.

In one embodiment, the display 261 may be configured to partially display a screen. For example, the display 261 may display the screen through the first area 261A positioned on the first surface 210A and the third surface 220A, and the second area 261B, the third area 261C, and/or the fourth area 261D may display the screen from points of view different from that of the first area 261A. In an embodiment, the screen display area of the display 261 may expand or may be reduced as the first housing 210 moves in the first direction and the second direction.

In one embodiment, when viewed from a direction (e.g., the −Z direction), the electronic device 201 may change in shape between a first shape (e.g., a reduced state as shown in FIG. 2A) having the screen display area (e.g., the first area 261A, the second area 261B, and the third area 261C) of a first size and a second shape (e.g., an expanded state as shown in FIG. 2B) having the screen display area (e.g., the first area 261A, the second area 261B, and the third area 261C) larger than the first size. For example, when the first housing 210 moves relative to the second housing 220 in the first direction (e.g., the +X direction) in the first shape, the screen display area of the electronic device 201 viewed from a direction (e.g., the −Z direction) may expand as the size of the first area 261A increases and the size of the fourth area 261D decreases. In one embodiment, in the second shape, when the first housing 210 moves relative to the second housing 220 in the second direction (e.g., the −X direction) opposite to the first direction, the size of the first area 261A may decrease and the size of the fourth area 261D may increase. While the electronic device 201 changes in shape between the first shape and the second shape, the size of the second area 261B and the size of the third area 261C may be substantially constant.

In one embodiment, the electronic device 201 may include a slide device 291 including a drive device 292 configured to move the first housing 210 and the second housing 220 relative to each other. The slide device 291 may be connected to the first housing 210 and the second housing 220 and may slide one of the first housing 210 and the second housing 220 relative to the other housing 210 or 220. As the first housing 210 or the second housing 220 moves, the display may expand or may be reduced.

In one embodiment, the electronic device 201 may include an input module 250 (e.g., the input module 150 of FIG. 1). The input module 250 may be formed, for example, on a third side surface 220C (e.g., the second left side surface) where the open portion 220E is not formed, of the plurality of third side surfaces 220C.

In one embodiment, the electronic device 201 may include a first sound output module 255A (e.g., the sound output module 155 of FIG. 1) and a second sound output module 255B (e.g., the sound output module 155 of FIG. 1). The first sound output module 255A may be on a first portion (e.g., an upper portion) of the first housing 210 and the second sound output module 255B may be on a second portion (e.g., a lower portion) different from the first portion of the first housing 210.

For example, in the first shape (e.g., the reduced state of the electronic device 201 of FIG. 2A), the first sound output module 255A may be configured to function as a transmitter/receiver and the second sound output module 255B may be configured to function as a speaker, whereas in the second shape (e.g., the expanded state of the electronic device 201 of FIG. 2B), the first sound output module 255A and the second sound output module 255B may be configured to function as a speaker. According to an embodiment of the disclosure, in the second shape, the first sound output module 255A and the second sound output module 255B may output stereo sound in cooperation with each other.

According to an embodiment of the disclosure, in the first shape, the second sound output module 255B may be configured to radiate sound through the first hole H1 and the second hole H2 substantially aligned with each other, and in the second shape, the second sound output module 255B may be configured to radiate sound through the first hole H1.

In one embodiment, at least one of the first sound output module 255A and the second sound output module 255B may be positioned in the second housing 220. According to an embodiment of the disclosure, the electronic device 201 may include only one of the first sound output module 255A and the second sound output module 255B, or may further include an additional sound output module in addition to the shown sound output modules.

In one embodiment, the electronic device 201 may include a haptic module 279 (e.g., the haptic module 179 of FIG. 1). The haptic module 279 may include, for example, a vibrator configured to generate vibrations. In an embodiment, the haptic module 279 may be positioned in the second housing 220. In one embodiment, the haptic module 279 may be positioned adjacent to the second sound output module 255B. According to one embodiment of the disclosure, the haptic module 279 may be positioned in the first housing 210.

In one embodiment, the electronic device 201 may include a first camera module 280A (e.g., the camera module 180 of FIG. 1) and a second camera module 280B (e.g., the camera module 180 of FIG. 1). The first camera module 280A may be configured to obtain an image of one direction (e.g., the +Z direction) of the electronic device 201, and the second camera module 280B may be configured to obtain an image of the other direction (e.g., the −Z direction) of the electronic device 201.

According to an embodiment of the disclosure, the first camera module 280A and the second camera module 280B may be in the second housing 220. According to another embodiment of the disclosure, at least one of the first camera module 280A or the second camera module 280B may be in the first housing 210. In one embodiment, the electronic device 201 may include only one of the first camera module 280A and the second camera module 280B, or may further include an additional camera module in addition to the shown camera modules.

In one embodiment, the electronic device 201 may include a battery 289 (e.g., the battery 189 of FIG. 1). In an embodiment, the battery 289 may be positioned in the first housing 210. The battery 289 may be at least partially enclosed by, for example, the first sound output module 255A, the first camera module 280A, the second camera module 280B, a first PCB 251, the slide device 291, a third PCB 253, the haptic module 279, and the second sound output module 255B. In one embodiment, The battery 289 may be positioned in the second housing 220.

In an embodiment, the electronic device 201 may include the first PCB 251, a second PCB 252, and the third PCB 253. The first PCB 251, the second PCB 252, and the third PCB 253 may include a plurality of metal layers, and a plurality of dielectrics each positioned between a pair of adjacent metal layers. In one embodiment, the first PCB 251 may be disposed in the second housing 220. The first PCB 251 may include a first electronic component 288 (e.g., the power management module 188 of FIG. 1). The second PCB 252 may be disposed in the first housing 210. For example, the second PCB 252 may be electrically connected to the slide device 291. The third PCB 253 may be positioned in the second housing 220. The third PCB 253 may be electrically connected to the haptic module 279.

According to one embodiment, the electronic device 201 may include the housings 210 and 220. Specifically, the electronic device 201 may include a first cover 211, a first plate 212, a second plate 213, and a reinforcing structure 214, and the first cover 211, the first plate 212, the second plate 213, and the reinforcing structure 214 may form the first housing 210. The electronic device 201 may include a second cover 221 and a third plate 222, and the second cover 221 and the third plate 222 may form the second housing 220.

In one embodiment, the first cover 211 may partially enclose the first sound output module 255A, the first camera module 280A, the haptic module 279, and the second sound output module 255B. The first plate 212 may at least partially accommodate electronic components (e.g., the slide device 291, the first sound output module 255A, the second sound output module 255B, the first camera module 280A, the second camera module 280B, the first PCB 251, the second PCB 252, the third PCB 253, a connector assembly, the haptic module 279, and other electronic components). The second plate 213 may be positioned between the first plate 212 and the display 261 to support the slide device 291 and the display 261.

In one embodiment, the second cover 221 may at least partially surround the first cover 211 and be coupled to the first cover 211 such that the first cover 211 may slide relative to the second cover 221.

In one embodiment, the second cover 221 may expose at least a portion (e.g., the second camera module 280B) of the electronic components to the outside of the electronic device 201. The third plate 222 may surround at least a portion of the second cover 221. The third plate 222 may be formed of a glass material. The structures of the first housing 210 and the second housing 220 described herein are not limited to the shown embodiments, and there may be various shapes of structures.

Figure 3A:
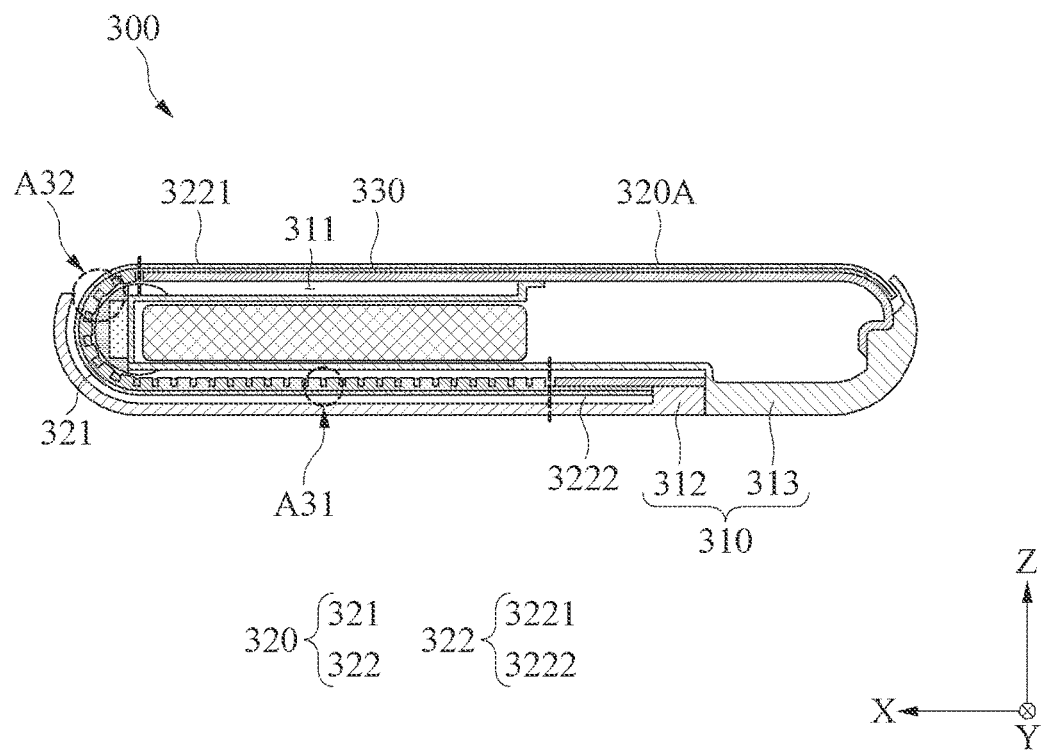
FIG. 3A is a cross-sectional view illustrating a first shape of an electronic device taken along a line II-II' of FIG. 2A according to an embodiment of the disclosure.
Figure 3B:
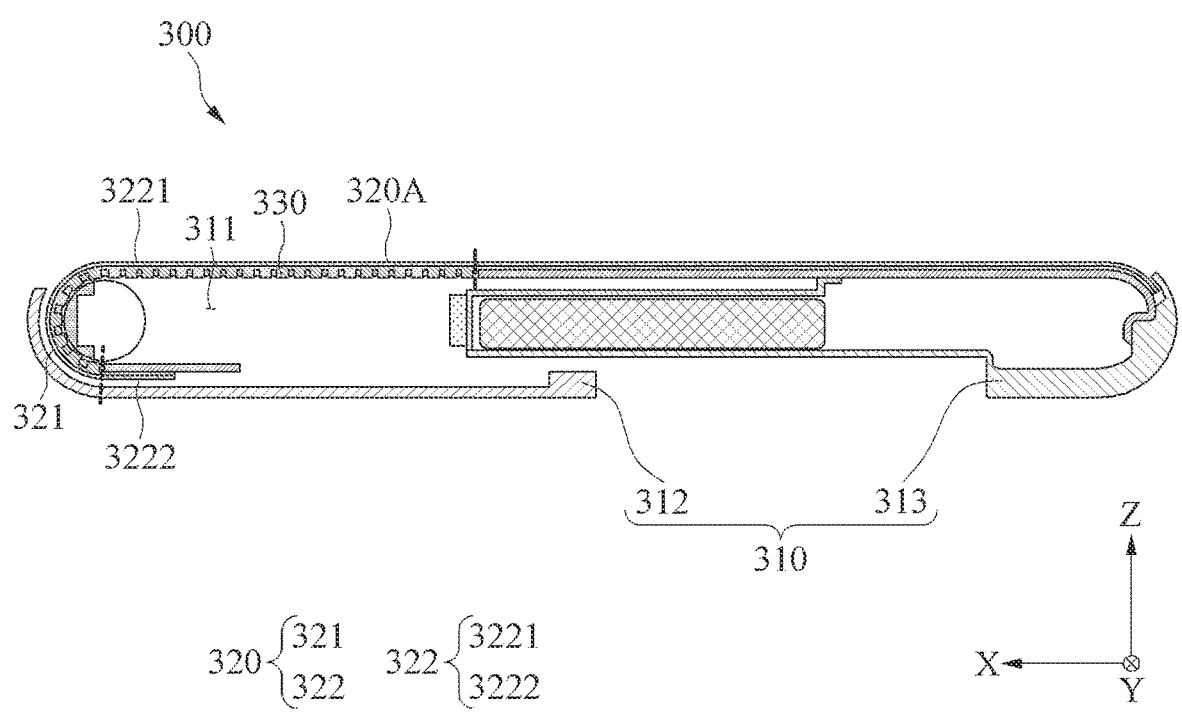
FIG. 3B is a cross-sectional view illustrating a second shape of an electronic device taken along the line II-II' of FIG. 2A according to an embodiment of the disclosure.
Figure 3C:
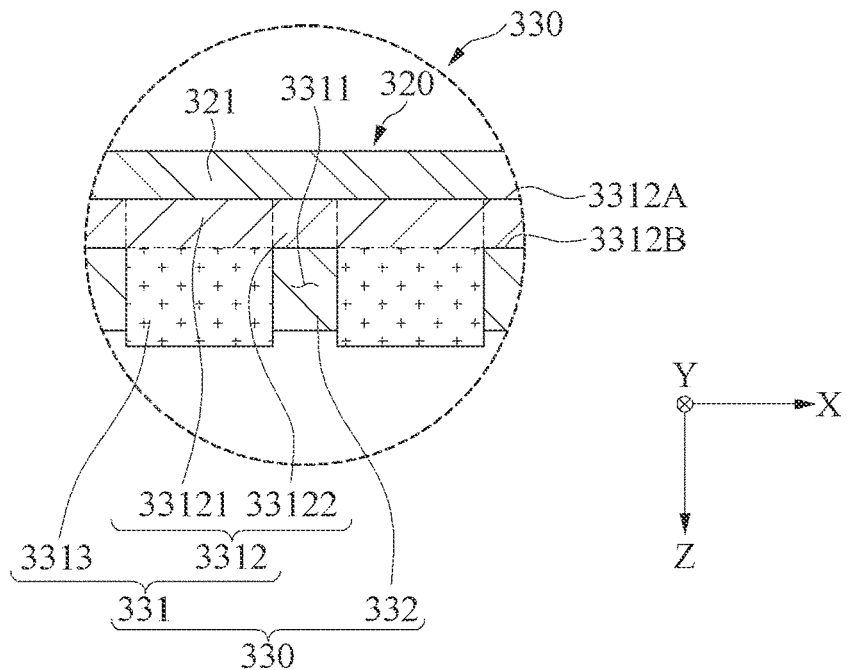
FIG. 3C is an enlarged view of a portion A31 of FIG. 3A according to an embodiment of the disclosure.
Figure 3D:
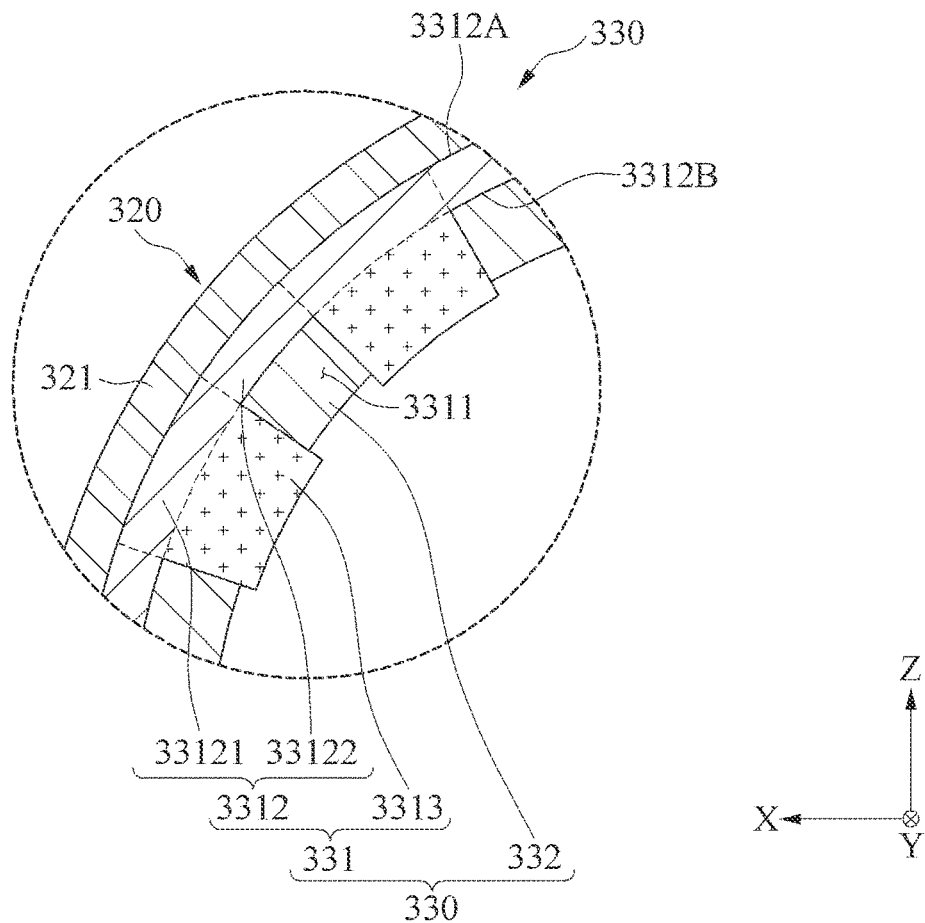
FIG. 3D is an enlarged view of a portion A32 of FIG. 3A according to an embodiment of the disclosure.

FIG. 3A is a cross-sectional view illustrating a first shape of an electronic device taken along a line II-II' of FIG. 2A according to an embodiment of the disclosure, FIG. 3B is a cross-sectional view illustrating a second shape of the electronic device taken along the line II-II' of FIG. 2A according to an embodiment of the disclosure, FIG. 3C is an enlarged view of a portion A31 of FIG. 3A according to an embodiment of the disclosure, and FIG. 3D is an enlarged view of a portion A32 of FIG. 3A according to an embodiment of the disclosure.

Referring to FIGS. 3A and 3B, an electronic device 300 (e.g., the electronic device 101 of FIG. 1, the electronic device 201 of FIGS. 2A to 2E) may include a housing 310 (e.g., the housings 210 and 220 of FIGS. 2A to 2E), a flexible display 320 (e.g., the display module 160 of FIG. 1, the display 261 of FIGS. 2A to 2E), and a reinforcing structure 330 (e.g., the reinforcing structure 214 of FIGS. 2A to 2E).

In one embodiment, the housing 310 may include a first housing 312 and a second housing 313 forming an exterior of the electronic device 300. In one embodiment, the housing 310 may form an internal space 311 therein. In one embodiment, the first housing 312 and the second housing 313 may be partially movably connected to each other in a moving direction (e.g., an X-axis direction). For example, in the process of changing the shape of the electronic device 300 (e.g., the process of changing from the first shape of FIG. 3A to the second shape of FIG. 3B), the second housing 313 may move relative to the first housing 312 in the moving direction (e.g., the X-axis direction).

In one embodiment, the flexible display 320 may be supported by the first housing 312 and the second housing 313, and may be visually exposed to the outside, for example, a front surface (e.g., a surface facing a +Z-axis direction) of the housing 310, of the electronic device 300 through a display area 320A. In one embodiment, in the flexible display 320, an area of the display area 320A that is visually exposed to the outside may change according to the relative movement of the first housing 312 and the second housing 313. For example, the flexible display 320 may change between a first state in which the area of the display area 320A is at the minimum as shown in FIG. 3A and a second state in which the area of the display area 320A is at the maximum as shown in FIG. 3B. In one embodiment, the flexible display 320 may include a non-rolling portion 322 of which the surface curvature is maintained to be constant and a rolling portion 321 of which the surface is at least partially rolled or bent, in the process of changing from the first state to the second state according to an operation of the electronic device 300.

In one embodiment, the non-rolling portion 322 may include, regardless of the operation of the electronic device 300, a first non-rolling portion 3221 that is exposed to the outside and forms a portion of the display area 320A and a second non-rolling portion 3222 that is drawn into the internal space 311. For example, the first non-rolling portion 3221 and the second non-rolling portion 3222 may be connected to both ends of the rolling portion 321 based on the moving direction (e.g., the X-axis direction). In one embodiment, the surface curvature of the rolling portion 321 may change according to the operation of the electronic device 300. For example, the degree of bending of the surface of the rolling portion 321 may change in the process of moving according to a change in the shape of the electronic device 300.

In one embodiment, the reinforcing structure 330 may reinforce the flexible display 320, thereby enhancing the durability of the flexible display 320. In one embodiment, the reinforcing structure 330 may be disposed on the rear surface (e.g., the surface facing the +Z axis) of the flexible display 320 to support the flexible display 320.

Referring to FIGS. 3C and 3D, the reinforcing structure 330 may include a support 331 and a reinforcing member 332.

In an embodiment, the support 331 may be connected to the flexible display 320 to cover a rear surface of the rolling portion 321. For example, in a state in which the surface of the flexible display 320 is viewed, the support 331 may overlap the rolling portion 321 of the flexible display 320. In one embodiment, the support 331 may include a plurality of uneven areas disposed on a surface (e.g., a surface facing the +Z axis) opposite to the rolling portion 321. The plurality of uneven areas may form a plurality of recesses 3311 disposed on the rear surface of the flexible display 320. In one embodiment, the support 331 may include a first supporting member 3312 and a second supporting member 3313.

In one embodiment, the first supporting member 3312 may be disposed on the rear surface (e.g., the surface facing the +Z axis) of the flexible display 320. For example, the first supporting member 3312 may be disposed to overlap the entire area of the rear surface (e.g., the surface facing the +Z axis) of the flexible display 320. However, this is merely an example, and the first supporting member 3312 may be omitted from at least one partial area of the rear surface of the non-rolling portion (e.g., the non-rolling portion 322 of FIG. 3A). In one embodiment, the first supporting member 3312 may include a first support surface 3312A facing the rear surface of the flexible display 320 and a second support surface 3312B facing a direction opposite to the first support surface 3312A. In one embodiment, the first supporting member 3312 may include, based on a state in which the surface of the flexible display 320 is viewed, a plurality of first connecting portions 33121 to which a plurality of second supporting members 3313, which will be described later, are connected to overlap, and a plurality of second connecting portions 33122 positioned between the plurality of first connecting portions 33121. For example, based on the state in which the surface of the flexible display 320 is viewed, the first connecting portions 33121 may be portions to which the second supporting members 3313 are connected to overlap.

In one embodiment, a second supporting member 3313 may be connected to a first supporting member 3312 to protrude in the direction of the second support surface 3312B (e.g., the +Z-axis direction). In an embodiment, a plurality of second supporting members 3313 may be provided, and the plurality of second supporting members 3313 may form uneven areas on the surface of the second support surface 3312B. In one embodiment, a recess 3311 may be formed between the plurality of second supporting members 3313. For example, an uneven pattern may be formed on the surface of the second support surface 3312B through portions protruding through the second supporting members 3313, and the recess 3311 between the second supporting members 3313. In one embodiment, the plurality of second supporting members may protrude from the first supporting member to different heights. For example, the recesses may be different in volume. In one embodiment, the plurality of second supporting members 3313 may include a multi-bar.

In one embodiment, a second supporting member 3313 may be formed of a material having higher rigidity than a first supporting member 3312. For example, the second supporting member 3313 may be formed of a material that less deforms than the first supporting member 3312, in the process of the flexible display 320 changing from the first state to the second state. According to an embodiment of the disclosure, the second supporting member 3313 may be formed of a metal material. However, this is merely an example, and the material of the first supporting member 3312 and the material of the second supporting member 3313 are not limited thereto. For example, the first supporting member 3312 and the second supporting member 3313 may be integrally formed of the same material.

In one embodiment, in a state in which the surface of the flexible display 320 is viewed, the second supporting member 3313 may be formed to overlap the rolling portion 321. In an embodiment, the second supporting member 3313 may be connected to the first connecting portion 33121 of the first supporting member 3312. In this case, the surface of the second connecting portion 33122 of the second supporting member 3313, (i.e., the second support surface 3312B) may form the bottom surface of the recess 3311, and at least a portion of the outer surface of the second supporting member 3313 may form an inner circumferential surface of the recess 3311.

However, the foregoing is merely an example, and the arrangement position of the second supporting member 3313 with respect to the flexible display 320 is not limited thereto. For example, in a state in which the surface of the flexible display 320 is viewed, the second supporting member 3313 may be formed to overlap not only the rolling portion 321 but also at least a portion of the non-rolling portion 322.

According to an embodiment of the disclosure, a plurality of reinforcing members 332 may be provided, and at least one reinforcing member 332 may be connected to the support 331 to be positioned in the recess 3311. For example, at least two of the reinforcing members 332 are positioned in one of the recesses 3311. At least two reinforcing members 332 are arranged to be parallel to each other. In one embodiment, a reinforcing member 332 may be disposed to overlap the second connecting portion 33122. The reinforcing member 332 may reinforce the flexible display 320 in the recess 3311, thereby reducing the bending and deforming of the flexible display 320 in the direction of the recess 3311 (e.g., the +z-axis direction) when an external force (e.g., a pen press) or impact (e.g., a pen drop) is applied to the surface of the flexible display 320. In one embodiment, in the process of the flexible display 320 changing from the first state to the second state, the reinforcing member 332 may change in shape to correspond to the shape of the flexible display 320. For example, in response to the shape change that increases the curvature of the flexible display 320 as shown in FIGS. 3C and 3D, the reinforcing member 332 may change in shape as being compressed to correspond to the shape of the flexible display 320.

In one embodiment, the reinforcing member 332 may be formed of a material that is deformable in shape, so as to adapt to the change of the flexible display 320 from the first state to the second state while reinforcing the flexible display 320. For example, the reinforcing member 332 may include at least one of a plastic material such as polyimide (PI) or a metal material having high ductility. According to an embodiment of the disclosure, the reinforcing member 332 may be formed by processing the plastic material and/or the metal material to a thin thickness (e.g., a thickness of 1 mm or less).

Figure 4A:
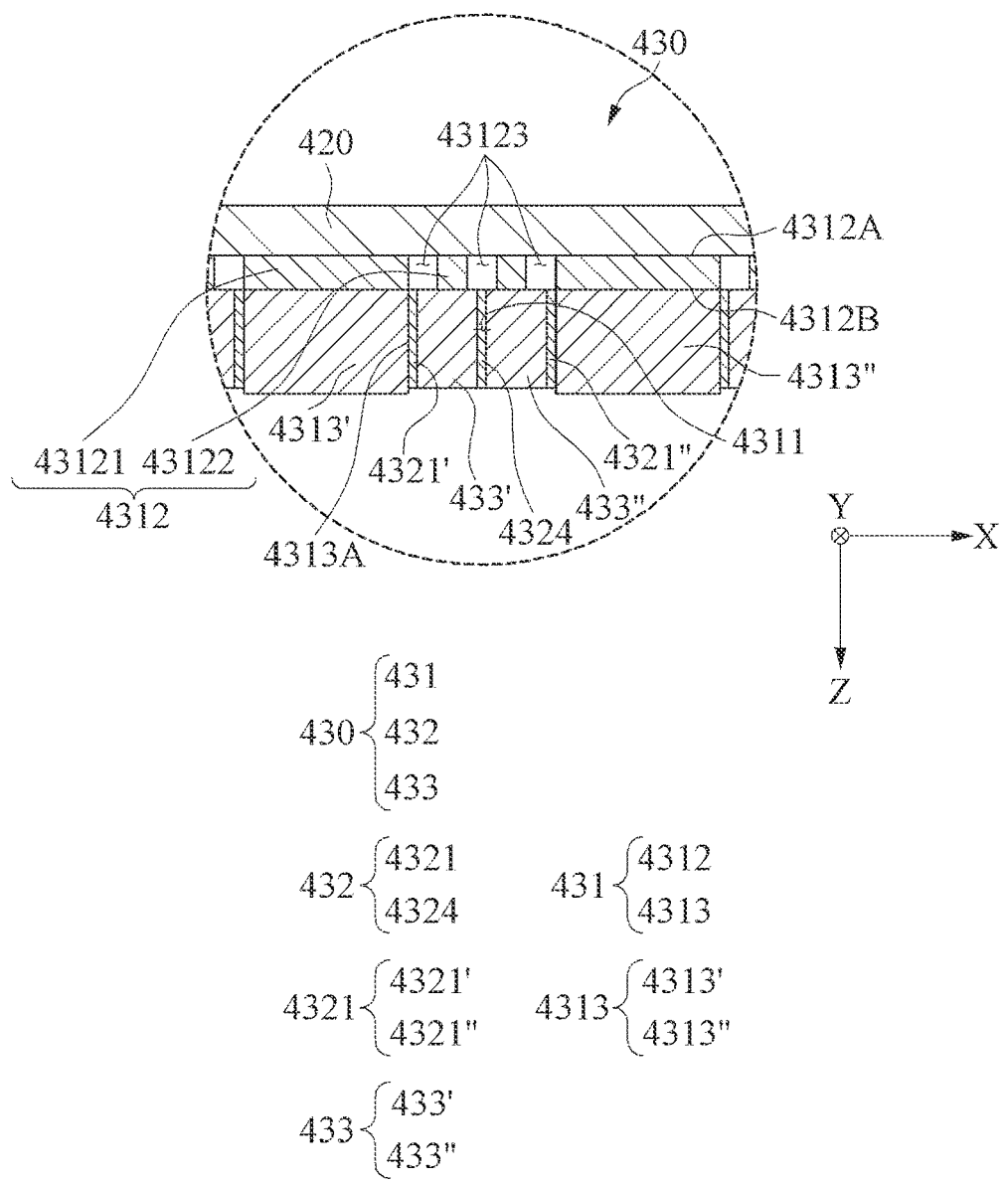
FIG. 4A is an enlarged view of the portion A31 of FIG. 3A according to an embodiment of the disclosure.
Figure 4B:
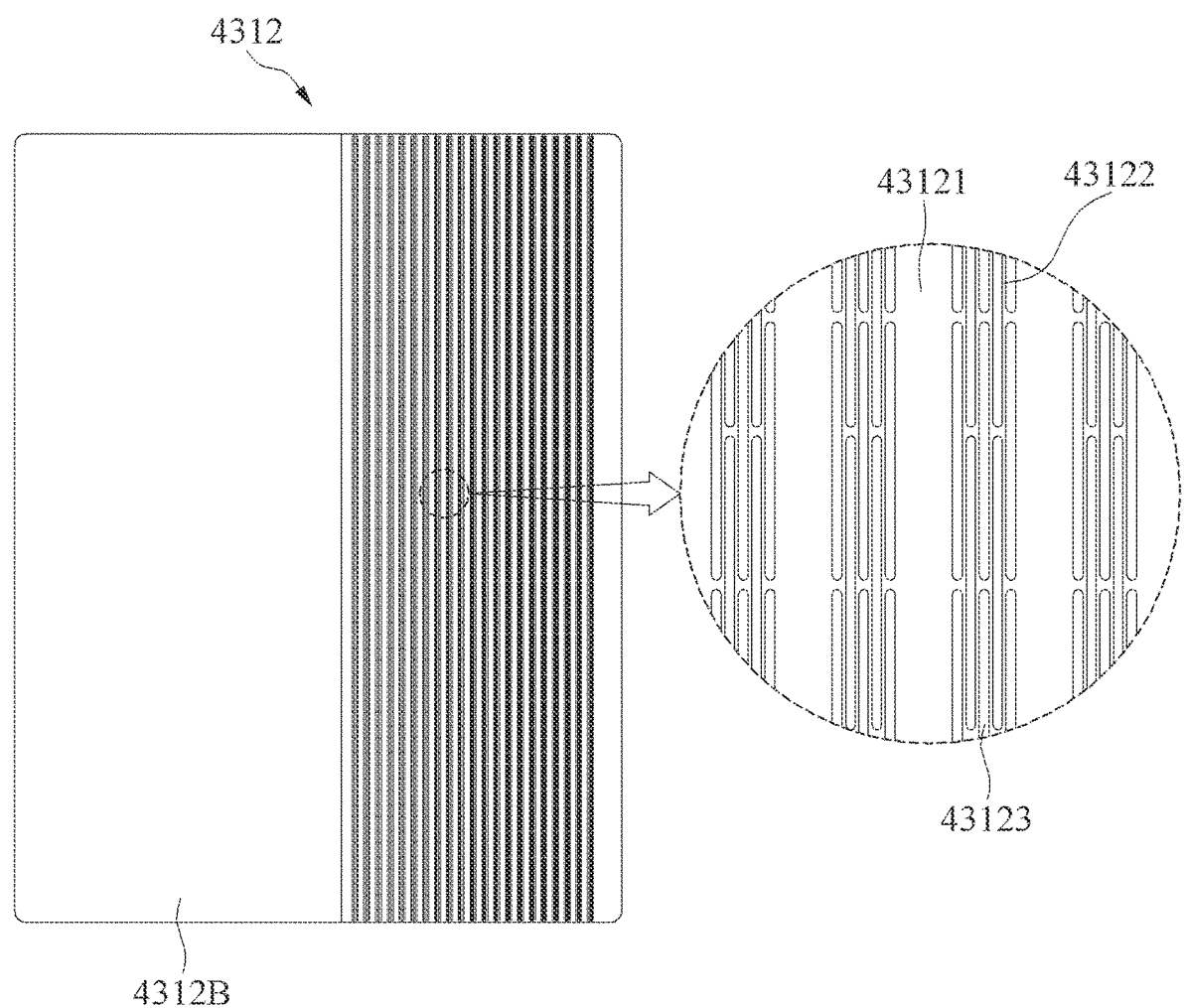
FIG. 4B is a plan view of a first supporting member according to an embodiment of the disclosure.

FIG. 4A is an enlarged view of the portion A31 of FIG. 3A according to an embodiment of the disclosure, and FIG. 4B is a plan view of a first supporting member according to an embodiment of the disclosure.

Referring to FIGS. 4A and 4B, a reinforcing structure 430 (e.g., the reinforcing structure 214 of FIGS. 2A to 2E, the reinforcing structure 330 of FIG. 3A) may include a support 431, a reinforcing member 432, and a compression member 433.

In one embodiment, the support 431 may include a first supporting member 4312 and a second supporting member 4313. In one embodiment, the first supporting member 4312 may include a first support surface 4312A facing a rear surface of a flexible display 420 and a second support surface 4312B opposite to the first support surface 4312A. In one embodiment, the first supporting member 4312 may include, based on a state in which the surface of the flexible display 420 is viewed, a plurality of first connecting portions 43121 to which a plurality of second supporting members 4313 are connected to overlap, and a plurality of second connecting portions 43122 positioned between the plurality of first connecting portions 43121. In one embodiment, the plurality of second supporting members 4313 may be connected to the first supporting member 4312, and a recess 4311 may be formed between the plurality of second supporting members 4313. In this case, the second connecting portion 43122 of the first supporting member 4312 may form the bottom surface of the recess 4311, and side surfaces of a pair of second supporting members 4313' and 4313" that face each other may form an inner circumferential surface of the recess 4311.

In one embodiment, the first supporting member 4312 may include an opening 43123 formed in the second support surface 4312B of the second connecting portion 43122. In an embodiment, the opening 43123 may be formed through at least a portion of the first supporting member 4312. For example, as shown in FIG. 4B, a plurality of openings 43123 may be formed to have a longitudinal direction (e.g., a direction perpendicular to the moving direction of FIG. 3A (a Y-axis direction), with respect to the second support surface 4312B of each second connecting portion 43122. The opening 43123 may enhance the flexibility in the shape change of the first supporting member 4312, so that the first supporting member 4312 may change to correspond to the shape of the flexible display 420 in the process of the flexible display 420 changing from the first state to the second state. For example, the first supporting member 4312 may include a branch plate having a lattice structure.

According to an embodiment of the disclosure, a plurality of reinforcing members 432 may be provided, and connected to the support 431 so that at least a portion thereof may be positioned in an uneven space of the recess 4311. In one embodiment, based on a state in which the surface of the flexible display 420 is viewed, the reinforcing member 432 may be disposed to overlap the second connecting portion 43122. For example, the reinforcing member 432 may be connected to the second support surface 4312B of the second connecting portion 43122 in which the opening 43123 is formed. In an embodiment, the reinforcing member 432 may include a first reinforcing member 4321 and a fourth reinforcing member 4324.

In one embodiment, the first reinforcing member 4321 may be connected to a first surface 4313A of the second supporting member 4313 forming the inner circumferential surface of the recess 4311. For example, one side of the first reinforcing member 4321 may be secured to the first surface 4313A, and the other side of the first reinforcing member 4321 may be connected to the second support surface 4312B of the second connecting portion 43122 in which the opening 43123 is formed. In one embodiment, first reinforcing members 4321' and 4321" may be respectively disposed on first surfaces 4313A of a pair of second supporting members 4313 that face each other, based on one recess 4311. For example, the pair of first reinforcing members 4321' and 4321" may be disposed to face each other in one recess 4311.

In one embodiment, the fourth reinforcing member 4324 may be disposed in the recess 4311 to be spaced apart from the first reinforcing member 4321 in parallel. For example, one side of the fourth reinforcing member 4324 may be secured to the compression member 433, which will be described later, and the other side of the fourth reinforcing member 4324 may be connected to the second support surface 4312B of the second connecting portion 43122 in which the opening 43123 is formed.

In one embodiment, the compression member 433 may be formed of a compressible material and disposed in the recess 4311. The compression member 433 may be compressed in response to a change of the flexible display 420 from the first state to the second state. The compression member 433 may change in shape to adapt to the change of the flexible display 420 from the first state to the second state and simultaneously support the reinforcing member 432. In one embodiment, the compression member 433 may be formed of a material having lower rigidity than the reinforcing member 432. For example, the compression member 433 may include a synthetic resin-based sponge material. However, this is merely an example, and the material of the compression member 433 is not limited thereto.

In one embodiment, each compression member 433 may be disposed between the first reinforcing member 4321 and the fourth reinforcing member 4324. For example, two compression members 433' and 433" may be provided, wherein the first compression member 433' may be disposed between a first-first reinforcing member 4321' and the fourth reinforcing member 4324, and the second compression member 433" may be disposed between the fourth reinforcing member 4324 and a first-second reinforcing member 4321". Although FIG. 4A shows that the reinforcing member 432 and the compression member 433 are the same in vertical length (e.g., the length in the Z-axis direction), this is merely an example. The compression member 433 may be shorter in the vertical length (e.g., the length in the Z-axis direction) than the reinforcing member 432.

Although not shown in the drawings, the number and arrangement of the fourth reinforcing members 4324 and the compression members 433 are not limited to the examples described above. For example, as shown in FIG. 8B, a plurality of fourth reinforcing members 8324 may be disposed in one recess 8311 to be spaced apart from each other. In this case, a plurality of compression members 833 may be disposed respectively in areas of the recess 8311 that are partitioned by the plurality of fourth reinforcing members 8324.

Figure 5:
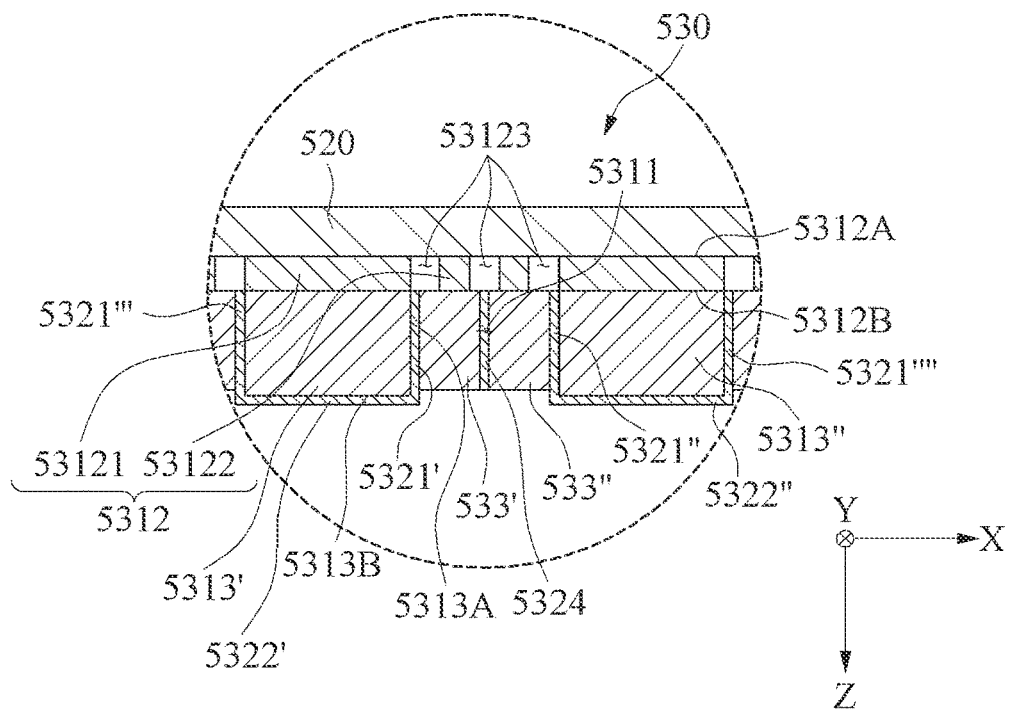
FIG. 5 is an enlarged view of the portion A31 of FIG. 3A according to an embodiment of the disclosure.

FIG. 5 is an enlarged view of the portion A31 of FIG. 3A according to an embodiment of the disclosure.

Referring to FIG. 5, a reinforcing structure 530 (e.g., the reinforcing structure 214 of FIGS. 2A to 2E, the reinforcing structure 330 of FIG. 3A) may include a support 531, a reinforcing member 532, and a compression member 533.

In one embodiment, the support 531 may include a first supporting member 5312 and a second supporting member 5313. In one embodiment, the first supporting member 5312 may include a first support surface 5312A facing a rear surface of a flexible display 520 and a second support surface 5312B opposite to the first support surface 5312A. In one embodiment, the first supporting member 5312 may include, based on a state in which the surface of the flexible display 520 is viewed, a plurality of first connecting portions 53121 to which a plurality of second supporting members 5313 are connected to overlap, and a plurality of second connecting portions 53122 positioned between the plurality of first connecting portions 53121. In one embodiment, a plurality of second supporting members 5313 may be provided, and a recess 5311 may be formed between the plurality of second supporting members 5313. In one embodiment, the first supporting member 5312 may include an opening 53123 formed in the second support surface 5312B of the second connecting portion 53122.

According to an embodiment of the disclosure, a plurality of reinforcing members 532 may be provided, and at least a portion thereof may be connected to the support 531 to be positioned in the recess 5311. In one embodiment, a reinforcing member 532 may be disposed to overlap the second connecting portion 53122. In one embodiment, the reinforcing member 532 may include a first reinforcing member 5321, a second reinforcing member 5322, and a fourth reinforcing member 5324.

In one embodiment, the first reinforcing member 5321 may be connected to a first surface 5313A of the second supporting member 5313 forming the inner circumferential surface of the recess 5311. For example, one side of the first reinforcing member 5321 may be secured to the first surface 5313A, and the other side of the first reinforcing member 5321 may be connected to the second support surface 5312B of the second connecting portion 53122 in which the opening 53123 is formed.

In one embodiment, the second reinforcing member 5322 may be connected to a second surface 5313B of the second supporting member 5313 positioned outside of the recess 5311. In one embodiment, the second surface 5313B of the second supporting member 5313 may be a surface facing the direction that is parallel to the second support surface 5312B. In one embodiment, based on one second supporting member 5313, the first reinforcing member 5321 and the second reinforcing member 5322 may be connected to each other. For example, a first-first reinforcing member 5321', a first-third reinforcing member 5321", and a second-first reinforcing member 5322' surrounding a second-first supporting member 5313' may be integrally formed. According to an embodiment of the disclosure, a first-second reinforcing member 5321", a first-fourth reinforcing member 5321"", and a second-second reinforcing member 5322" surrounding a second-second supporting member 5313" may be integrally formed. In one embodiment, the second reinforcing member 5322 may be secured to the second supporting member 5313 through an adhesive or a separate securing member. In this structure, the reinforcing member 532 may be easily secured to the support 531.

In one embodiment, the fourth reinforcing member 5324 may be disposed in the recess 5311 to be spaced apart from the first reinforcing member 5321 in parallel. For example, one side of the fourth reinforcing member 5324 may be secured to the compression member 533, which will be described later, and the other side of the fourth reinforcing member 5324 may be connected to the second support surface 5312B of the second connecting portion 53122 in which the opening 53123 is formed.

In one embodiment, the compression member 533 may be formed of a compressible material and disposed in the recess 5311. The compression member 533 may be compressed in response to a change of the flexible display 520 from the first state to the second state. The compression member 533 may change in shape to adapt to the change of the flexible display 520 from the first state to the second state and simultaneously support the reinforcing member 532. In one embodiment, each compression member 533 may be disposed between the first reinforcing member 5321 and the fourth reinforcing member 5324. For example, of two compression members 533' and 533", the first compression member 533' may be disposed between a first-first reinforcing member 5321' and the fourth reinforcing member 5324, and the second compression member 533" may be disposed between the fourth reinforcing member 5324 and a first-second reinforcing member 5321".

Figure 6:
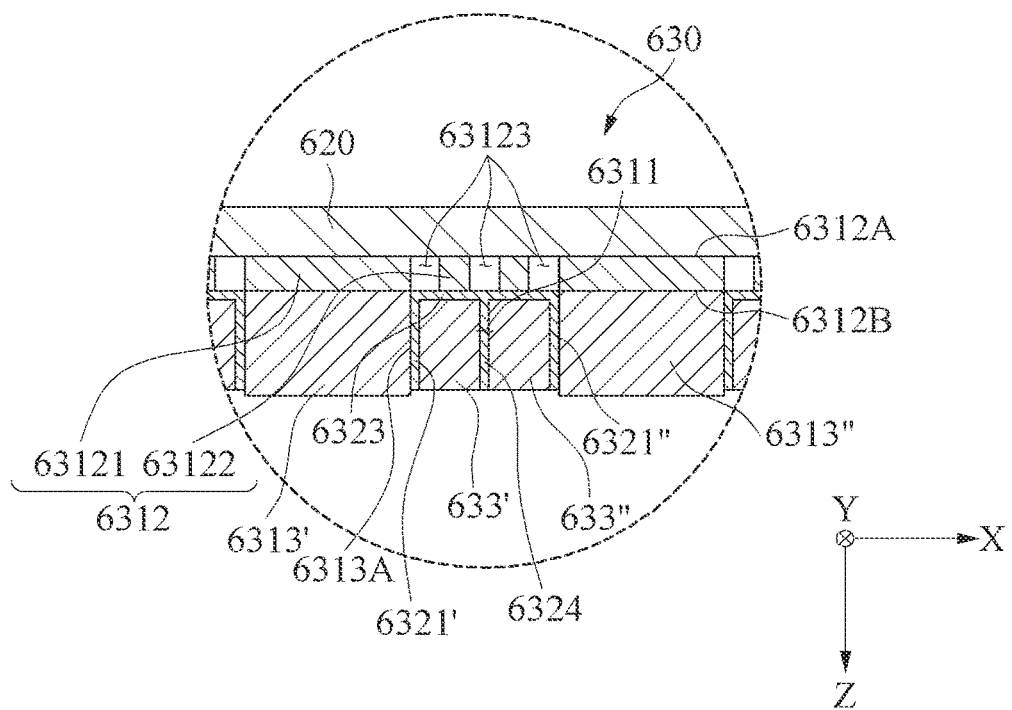
FIG. 6 is an enlarged view of the portion A31 of FIG. 3A according to an embodiment of the disclosure.

FIG. 6 is an enlarged view of the portion A31 of FIG. 3A according to an embodiment of the disclosure.

Referring to FIG. 6, a reinforcing structure 630 (e.g., the reinforcing structure 214 of FIGS. 2A to 2E, the reinforcing structure 330 of FIG. 3A) may include a support 631, a reinforcing member 632, and a compression member 633.

In one embodiment, the support 631 may include a first supporting member 6312 and a second supporting member 6313. In one embodiment, the first supporting member 6312 may include a first support surface 6312A facing a rear surface of a flexible display 620 and a second support surface 6312B opposite to the first support surface 6312A. In one embodiment, the first supporting member 6312 may include, based on a state in which the surface of the flexible display 620 is viewed, a plurality of first connecting portions 63121 to which a plurality of second supporting members 6313 are connected to overlap, and a plurality of second connecting portions 63122 positioned between the plurality of first connecting portions 63121. According to an embodiment of the disclosure, a plurality of second supporting members 6313 may be provided, and a recess 6311 may be formed between the plurality of second supporting members 6313. In one embodiment, the first supporting member 6312 may include an opening 63123 formed in the second support surface 6312B of the second connecting portion 63122.

According to an embodiment of the disclosure, a plurality of reinforcing members 632 may be provided, and at least a portion thereof may be connected to the support 631 to be positioned in the recess 6311. In one embodiment, a reinforcing member 632 may be disposed to overlap the second connecting portion 63122. In one embodiment, the reinforcing member 632 may include a first reinforcing member 6321, a third reinforcing member 6323, and a fourth reinforcing member 6324.

In one embodiment, the first reinforcing member 6321 may be connected to a first surface 6313A of the second supporting member 6313 forming the inner circumferential surface of the recess 6311. For example, one side of the first reinforcing member 6321 may be secured to the first surface 6313A, and the other side of the first reinforcing member 6321 may be connected to the second support surface 6312B of the second connecting portion 63122 in which the opening 63123 is formed.

In one embodiment, the third reinforcing member 6323 may be connected to the second support surface 6312B of the first supporting member 6312 to cover the second connecting portion 63122. In one embodiment, the third reinforcing member 6323 may be provided to have lower rigidity than the first reinforcing member 6321 and the fourth reinforcing member 6324. For example, the thickness of the third reinforcing member 6323 may be less than the thickness of the first reinforcing member 6321 and the fourth reinforcing member 6324. Uneven areas may be formed on the surface of the third reinforcing member 6323. In one embodiment, based on one recess 6311, the first reinforcing member 6321 and the third reinforcing member 6323 may be connected to each other. For example, a first-first reinforcing member 6321', a first-second reinforcing member 6321", and a third reinforcing member 6323, which are connected to the inner circumferential surface of one recess 6311, may be integrally formed.

In one embodiment, the fourth reinforcing member 6324 may be disposed in the recess 6311 to be spaced apart from the first reinforcing member 6321 in parallel. For example, one side of the fourth reinforcing member 6324 may be secured to the compression member 633, which will be described later, and the other side of the fourth reinforcing member 6324 may be connected to the second support surface 6312B of the second connecting portion 63122 in which the opening 63123 is formed. In one embodiment, the fourth reinforcing member 6324 may be connected to the third reinforcing member 6323 to protrude in a direction parallel to the second supporting member 6313. For example, the first reinforcing member 6321, the third reinforcing member 6323, and the fourth reinforcing member 6324, which are disposed in one recess 6311, may be integrally formed.

In one embodiment, the compression member 633 may be formed of a compressible material and disposed in the recess 6311. The compression member 633 may be compressed in response to a change of the flexible display 620 from the first state to the second state. The compression member 633 may change in shape to adapt to the change of the flexible display 620 from the first state to the second state and simultaneously support the reinforcing member 632. In one embodiment, each compression member 633 may be disposed between the first reinforcing member 6321 and the fourth reinforcing member 6324. For example, of two compression members 633' and 633", the first compression member 633' may be disposed between a first-first reinforcing member 6321' and the fourth reinforcing member 6324, and the second compression member 633" may be disposed between the fourth reinforcing member 6324 and a first-second reinforcing member 6321".

Figure 7:
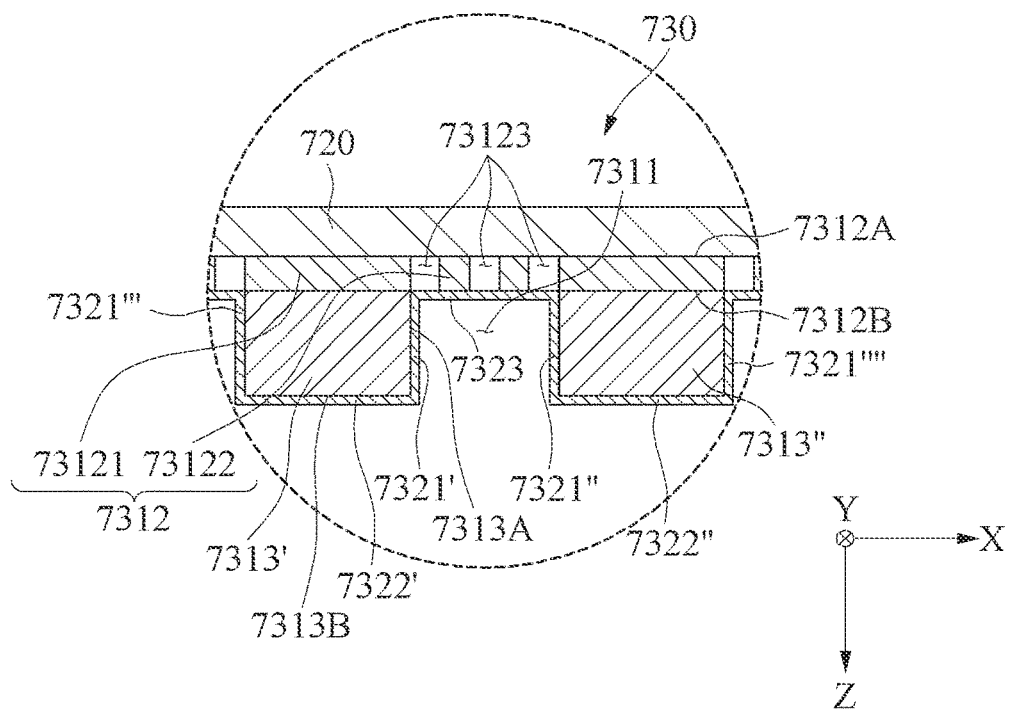
FIG. 7 is an enlarged view of the portion A31 of FIG. 3A according to an embodiment of the disclosure.

FIG. 7 is an enlarged view of the portion A31 of FIG. 3A according to an embodiment of the disclosure.

Referring to FIG. 7, a reinforcing structure 730 (e.g., the reinforcing structure 214 of FIGS. 2A to 2E, the reinforcing structure 330 of FIG. 3A) may include a support 731, a reinforcing member 732, and a compression member 733.

In one embodiment, the support 731 may include a first supporting member 7312 and a second supporting member 7313. In one embodiment, the first supporting member 7312 may include a first support surface 7312A facing a rear surface of a flexible display 720 and a second support surface 7312B opposite to the first support surface 7312A. In one embodiment, the first supporting member 7312 may include, based on a state in which the surface of the flexible display 720 is viewed, a plurality of first connecting portions 73121 to which a plurality of second supporting members 7313 are connected to overlap, and a plurality of second connecting portions 73122 positioned between the plurality of first connecting portions 73121. According to an embodiment of the disclosure, a plurality of second supporting members 7313 may be provided, and a recess 7311 may be formed between the plurality of second supporting members 7313. In one embodiment, the first supporting member 7312 may include an opening 73123 formed in the second support surface 7312B of the second connecting portion 73122.

According to an embodiment of the disclosure, a plurality of reinforcing members 732 may be provided, and at least a portion thereof may be connected to the support 731 to be positioned in the recess 7311. A reinforcing member 732 may be disposed to overlap the second connecting portion 73122. In one embodiment, the reinforcing member 732 may include a first reinforcing member 7321, a second reinforcing member 7322, and a third reinforcing member 7323.

In one embodiment, the first reinforcing member 7321 may be connected to a first surface 7313A of the second supporting member 7313 forming the inner circumferential surface of the recess 7311. For example, one side of the first reinforcing member 7321 may be secured to the first surface 7313A, and the other side of the first reinforcing member 7321 may be connected to the second support surface 7312B of the second connecting portion 73122 in which the opening 73123 is formed.

In one embodiment, the second reinforcing member 7322 may be connected to a second surface 7313B of the second supporting member 7313 positioned outside of the recess 7311. In one embodiment, based on one second supporting member 7313, the first reinforcing member 7321 and the second reinforcing member 7322 may be connected to each other. For example, a first-first reinforcing member 7321', a first-third reinforcing member 7321", and a second-first reinforcing member 7322' surrounding a second-first supporting member 7313' may be integrally formed. Similarly, a first-second reinforcing member 7321"', a first-fourth reinforcing member 7321"", and a second-second reinforcing member 7322" surrounding a second-second supporting member 7313" may be integrally formed. In an embodiment, the second reinforcing member 7322 may be secured to the second supporting member 7313. In this structure, the reinforcing member 732 may be easily secured to the support 731.

In one embodiment, the third reinforcing member 7323 may be connected to the second support surface 7312B of the first supporting member 7312 to cover the second connecting portion 73122. In one embodiment, based on one recess 7311, the first reinforcing member 7321 and the third reinforcing member 7323 may be connected to each other. For example, a first-first reinforcing member 7321', a first-second reinforcing member 7321", and a third reinforcing member 7323, which are connected to the inner circumferential surface of one recess 7311, may be integrally formed. In one embodiment, the reinforcing member 732 may include a high-modulus material. For example, the reinforcing member 732 may include a material having high restoring force, such as at least one of polyimide or a metal material. The reinforcing member 732 may be manufactured by pre-molding and formed to have high rigidity.

Figure 8A:
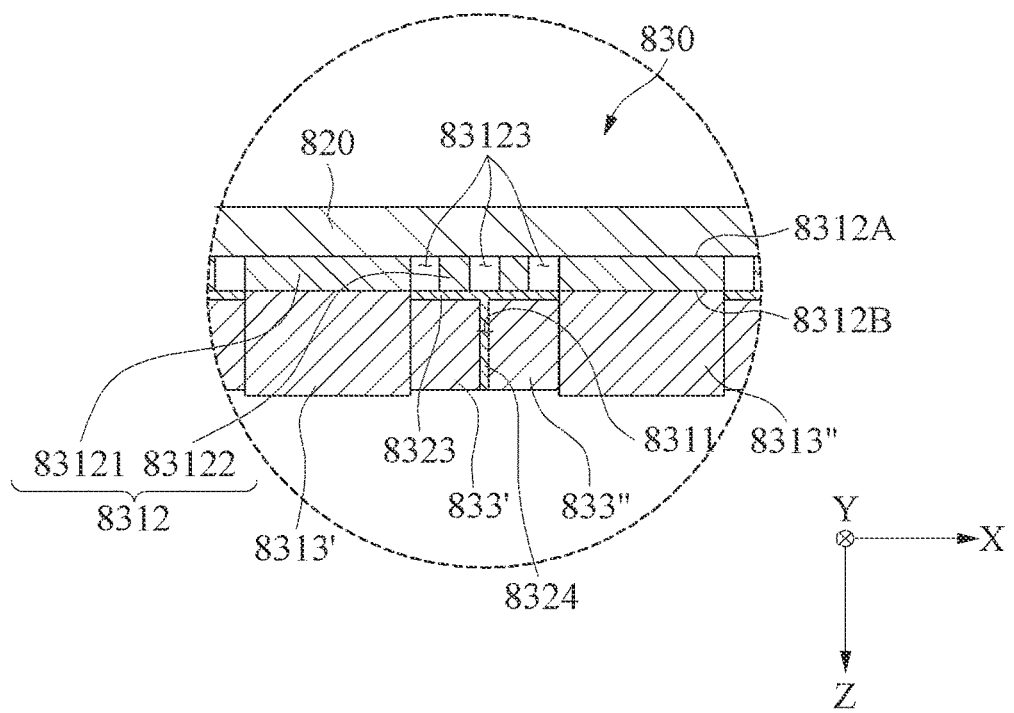
FIG. 8A is an enlarged view of the portion A31 of FIG. 3A according to an embodiment of the disclosure.
Figure 8B:
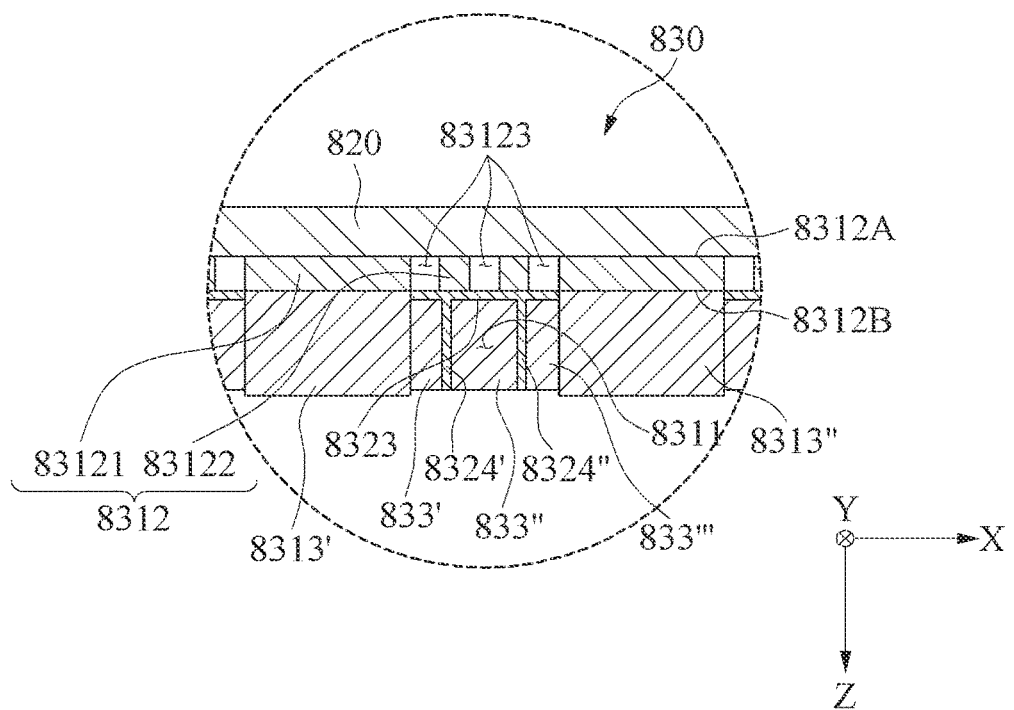
FIG. 8B is an enlarged view of the portion A31 of FIG. 3A according to an embodiment of the disclosure.

FIG. 8A is an enlarged view of the portion A31 of FIG. 3A according to an embodiment of the disclosure, and FIG. 8B is an enlarged view of the portion A31 of FIG. 3A according to an embodiment of the disclosure.

Referring to FIGS. 8A and 8B, a reinforcing structure 830 (e.g., the reinforcing structure 214 of FIGS. 2A to 2E, the reinforcing structure 330 of FIG. 3A) may include a support 831, a reinforcing member 832, and a compression member 833.

In one embodiment, the support 831 may include a first supporting member 8312 and a second supporting member 8313. In one embodiment, the first supporting member 8312 may include a first support surface 8312A facing a rear surface of a flexible display 820 and a second support surface 8312B opposite to the first support surface 8312A. In one embodiment, the first supporting member 8312 may include, based on a state in which the surface of the flexible display 820 is viewed, a plurality of first connecting portions 83121 to which a plurality of second supporting members 8313 are connected to overlap, and a plurality of second connecting portions 83122 positioned between the plurality of first connecting portions 83121. According to an embodiment of the disclosure, a plurality of second supporting members 8313 may be provided, and a recess 8311 may be formed between the plurality of second supporting members 8313. In one embodiment, the first supporting member 8312 may include an opening 83123 formed in the second support surface 8312B of the second connecting portion 83122.

In one embodiment, a plurality of reinforcing members 832 may be provided, and at least a portion thereof may be connected to the support 831 to be positioned in the recess 8311. In one embodiment, a reinforcing member 832 may be disposed to overlap the second connecting portion 83122. In one embodiment, the reinforcing member 832 may include a third reinforcing member 8323 and a fourth reinforcing member 8324.

In one embodiment, the third reinforcing member 8323 may be connected to the second support surface 8312B of the first supporting member 8312 to cover the second connecting portion 83122. For example, one side of the third reinforcing member 8323 may be connected to the second support surface 8312B, and the other side thereof may be connected to the second supporting member 8313.

In one embodiment, the fourth reinforcing member 8324 may be disposed in the recess 8311 to be spaced apart from the second supporting member 8313 in parallel. For example, one side of the fourth reinforcing member 8324 may be secured to the compression member 833, which will be described later. In one embodiment, the fourth reinforcing member 8324 may be connected to the third reinforcing member 8323 to protrude in a direction parallel to the second supporting member 8313. According to an embodiment of the disclosure, the third reinforcing member 8323 and the fourth reinforcing member 8324 may be integrally formed.

In one embodiment, the compression member 833 may be formed of a compressible material and disposed in the recess 8311. The compression member 833 may be compressed in response to a change of the flexible display 820 from the first state to the second state. The compression member 833 may change in shape to adapt to the change of the flexible display 820 from the first state to the second state and simultaneously support the reinforcing member 832.

In one embodiment, as shown in FIG. 8A, one fourth reinforcing member 8324 may be disposed in the recess 8311. In this case, compression members 833' and 833" may be disposed respectively in areas of the recess 8311 that are partitioned by the fourth reinforcing members 8324.

For example, a first-first compression member 833' may be disposed between a second-first supporting member 8313' and the fourth reinforcing member 8324. For example, a first-second compression member 833" may be disposed between the fourth reinforcing member 8324 and a second-second supporting member 8313".

In one embodiment, as shown in FIG. 8B, a plurality of fourth reinforcing members 8324 may be disposed in one recess 8311. The plurality of fourth reinforcing members 8324 may be disposed parallel to each other. For example, two fourth reinforcing members 8324' and 8324" may be provided, and three compression members 833', 833", and 833' may be provided.

For example, the first compression member 833' may be disposed between the second-first supporting member 8313' and a fourth-first reinforcing member 8324', the second compression member 833" may be disposed between the fourth-first reinforcing member 8324' and a fourth-second reinforcing member 8324", and the third compression member 833''' may be disposed between the fourth-second reinforcing member 8324" and the second-second supporting member 8313". However, this is merely an example, and the number of fourth reinforcing members is not limited thereto.

According to an embodiment of the disclosure, an electronic device 300 may include a first housing 312, a second housing 313 movable relative to the first housing 312, a flexible display 420 supported by at least one of the first housing 312 or the second housing 313, and configured to change between a first state in which an area of a display area 320A visually exposed to an outside to face a front surface according to a relative movement of the first housing 312 and the second housing 313 is at the minimum and a second state in which the area of the display area 320A is at the maximum, and a reinforcing structure 430 disposed on a rear surface of the flexible display 420, wherein the flexible display 420 may include a rolling portion 321 that is at least partially bent in a process of changing from the first state to the second state, and the reinforcing structure 430 may include a support 431 coupled to the flexible display 420 so as to cover a rear surface of the rolling portion 321, and including an uneven surface having a plurality of uneven areas, and a plurality of reinforcing members 432 connected to the support 431 so that at least a portion thereof is positioned in recesses 4311 formed on the uneven surface.

In one embodiment, the support 431 may include a first supporting member 4312 including a first support surface 4312A facing the rear surface of the flexible display 420 and a second support surface 4312B opposite to the first support surface 4312A, and a plurality of second supporting members 4313 connected to the first supporting member 4312 so as to protrude in a direction of the second support surface 4312B and form the uneven areas, wherein in a state in which the surface of the flexible display 420 is viewed, the second supporting members 4313 may overlap the rolling portion 321.

In one embodiment, the first supporting member 4312 may include, based on a state in which the first support surface is viewed, a plurality of first connecting portions 43121 to which the plurality of second supporting members 4313 are connected to overlap, and a plurality of second connecting portions 43122 positioned between the plurality of first connecting portions 43121, wherein the reinforcing members 432 may be disposed to overlap the second connecting portions 43122.

In one embodiment, the first supporting member 4312 may include openings 43123 formed in second support surfaces 4312B of the second connecting portions 43122.

In one embodiment, the first supporting member 4312 and the second supporting members 4313 may be integrally formed.

In one embodiment, the second supporting members 4313 may be formed of a material having higher rigidity than the first supporting member 4312.

In one embodiment, the reinforcing members 732 may include first reinforcing members 7321 connected to first surfaces 7313A of the second supporting members 7313 forming inner circumferential surfaces of the recesses 7311.

In one embodiment, the reinforcing members 732 may further include second reinforcing members 7322 connected to second surfaces 7313B of the second supporting members 7313 positioned outside of the recesses 7311.

In one embodiment, the first reinforcing members 7321 and the second reinforcing members 7322 may be connected to each other based on one of the second supporting members 7313.

In one embodiment, the reinforcing members 732 may further include third reinforcing members 7323 connected to the second support surface 7312B of the first supporting member 7312 so as to cover the second connecting portions 73122.

In one embodiment, the first reinforcing members 7321 and the third reinforcing members 7323 may be connected to each other based on one of the recesses 7311.

In one embodiment, the reinforcing structure 630 may be formed of a compressible material and further include compression members 633 disposed in the recesses 6311.

In one embodiment, the reinforcing members 632 may include first reinforcing members 6321 connected to first surfaces 6313A of the second supporting members 6313 forming inner circumferential surfaces of the recesses 6311, and fourth reinforcing members 6324 disposed in the recesses 6311 to be spaced apart from the first reinforcing members 6321 in parallel, wherein the compression members 633 may be respectively disposed between the first reinforcing members 6321 and the fourth reinforcing members 6324.

In one embodiment, the reinforcing members 632 may include third reinforcing members 6323 connected to the second support surface 6312B of the first supporting member 6312 so as to cover the second connecting portions 63122, and fourth reinforcing members 6324 connected to the third reinforcing members 6323 to protrude in a direction parallel to the second supporting members 6313.

In one embodiment, the reinforcing structure 630 may further include compression members 633 connected to the reinforcing members 632 so as to be positioned in the recesses 6311, wherein the compression members 633 may be formed of a deformable material.

According to an embodiment of the disclosure, a reinforcing structure 430 may include a support 431 connected to a flexible display 420 so as to cover a rear surface of the flexible display 420 and including an uneven surface having a plurality of uneven areas to be disposed on at least a portion of a surface opposite to the flexible display 420, and a plurality of reinforcing members 432 connected to the support 431 so that at least a portion thereof is positioned in recesses 4311 formed on the uneven surface.

The support 431 may include a first supporting member 4312 including a first support surface 4312A facing the rear surface of the flexible display 420 and a second support surface 4312B opposite to the first support surface 4312A, and a plurality of second supporting members 4313 connected to the first supporting member 4312 so as to protrude in a direction of the second support surface 4312B and form the uneven areas.

In one embodiment, the first supporting member 4312 may include, based on a state in which a surface of the flexible display 420 is viewed, a plurality of first connecting portions 43121 to which the plurality of second supporting members 4313 are connected to overlap, a plurality of second connecting portions 43122 positioned between the plurality of first connecting portions 43121, and openings 43123 formed in second support surfaces 4312B of the second connecting portions 43122, wherein the reinforcing members 432 may be disposed to overlap the second connecting portions 43122.

In one embodiment, the second supporting members 4313 may be formed of a material having higher rigidity than the first supporting member 4312.

According to an embodiment of the disclosure, an electronic device 300 may include a first housing 312, a second housing 313 partially movably connected to the first housing 312 in a moving direction, a flexible display 420 supported by the first housing 312 and the second housing 313, and configured to change between a first state in which an area of a display area 320A visually exposed to an outside according to a relative movement of the first housing 312 and the second housing 313 is at the minimum and a second state in which the area of the display area 320A is at the maximum, and a reinforcing structure 430 disposed on a rear surface of the flexible display 420, wherein the flexible display 420 may include a rolling portion 321 of which the surface curvature changes in a process of changing from the first state to the second state, and the reinforcing structure 430 may include a support 431 connected to the flexible display 420 so as to cover a rear surface of the rolling portion 321, and including an uneven surface having a plurality of uneven areas to be disposed on a surface opposite to the rolling portion 321, a plurality of reinforcing members 432 connected to the support 431 so that at least a portion thereof is positioned in recesses 4311 formed on the uneven surface, and compression members 433 connected to the reinforcing members 432 so as to be positioned in the recesses 4311, wherein the support 431 may include a first supporting member 4312 including a first support surface 4312A facing the rear surface of the flexible display 420 and a second support surface 4312B opposite to the first support surface 4312A, and a plurality of second supporting members 4313 connected to the first supporting member 4312 so as to protrude in a direction of the second support surface 4312B and form the uneven areas, wherein in a state in which the surface of the flexible display 420 is viewed, the second supporting members 4313 may overlap the rolling portion 321.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device, comprising:
a first housing;
a second housing movable relative to the first housing;
a flexible display configured to change size of a display area visually exposed to an outside of the electronic device between a first state and a second state, the flexible display including a rolling portion that is at least partially bent in a process of changing from the first state to the second state; and
a reinforcing structure supporting the flexible display, wherein the reinforcing structure comprises:
 a first supporting member disposed on a rear surface of the flexible display, the first supporting member including a first support surface facing the rear surface of the flexible display and a second support surface opposite to the first support surface, and
 a plurality of second supporting members connected to the first supporting member so as to protrude in a direction of the second support surface and form a plurality of recesses, and
 a plurality of reinforcing members, at least a portion thereof being positioned in the plurality of recesses, and
wherein, in the rolling portion, a reinforcing member among the plurality of reinforcing members is configured to change shape as being compressed to a shape of the flexible display.

2. The electronic device of claim 1,
wherein the first supporting member comprises:
 a plurality of first connecting portions to which the plurality of second supporting members are connected to overlap; and
 a plurality of second connecting portions positioned between the plurality of first connecting portions, and
wherein the plurality of reinforcing members are disposed to overlap the second connecting portions.

3. The electronic device of claim 2, wherein the first supporting member comprises openings formed in second support surfaces of the second connecting portions.

4. The electronic device of claim 2, wherein the plurality of reinforcing members comprise first reinforcing members connected to first surfaces of the second supporting members forming inner circumferential surfaces of the recesses.

5. The electronic device of claim 4, wherein the plurality of reinforcing members further comprise second reinforcing members connected to second surfaces of the second supporting members positioned outside of the recesses.

6. The electronic device of claim 5, wherein the first reinforcing members and the second reinforcing members are connected to each other based on one of the second supporting members.

7. The electronic device of claim 4, wherein the plurality of reinforcing members further comprise third reinforcing members connected to the second support surface of the first supporting member so as to cover the second connecting portions.

8. The electronic device of claim 7, wherein the first reinforcing members and the third reinforcing members are connected to each other based on one of the recesses.

9. The electronic device of claim 2,
wherein the reinforcing structure is formed of a compressible material, and
wherein the reinforcing structure further comprises:
 compression members disposed in the recesses.

10. The electronic device of claim 9,
wherein the plurality of reinforcing members comprise:
 first reinforcing members connected to first surfaces of the second supporting members forming inner circumferential surfaces of the recesses; and
 fourth reinforcing members disposed in the recesses to be spaced apart from the first reinforcing members in parallel, and
wherein the compression members are respectively disposed between the first reinforcing members and the fourth reinforcing members.

11. The electronic device of claim 2, wherein the plurality of reinforcing members comprise:
 third reinforcing members connected to the second support surface of the first supporting member so as to cover the second connecting portions; and
 fourth reinforcing members connected to the third reinforcing members to protrude in a direction parallel to the second supporting members.

12. The electronic device of claim 11,
wherein the reinforcing structure further comprises:
 compression members connected to the plurality of reinforcing members so as to be positioned in the recesses, and
wherein the compression members are formed of a deformable material.

13. The electronic device of claim 1, wherein the first supporting member and the second supporting members are integrally formed.

14. The electronic device of claim 1, wherein the second supporting members are formed of a material having higher rigidity than the first supporting member.

15. A reinforcing structure disposed on a rear surface of a flexible display, the reinforcing structure comprising:
 a support connected to the flexible display so as to cover the rear surface of the flexible display, the support comprising:
  a first supporting member comprising a first support surface facing the rear surface of the flexible display and a second support surface opposite to the first support surface, and
  a plurality of second supporting members connected to the first supporting member so as to protrude in a direction of the second support surface and form a plurality of uneven areas; and
 a plurality of reinforcing members connected to the support so that at least a portion thereof is positioned in recesses formed on the uneven areas,
wherein a reinforcing member among the plurality of reinforcing members is configured to change shape as being compressed to a shape of the flexible display.

16. The reinforcing structure of claim 15,
wherein the first supporting member comprises:
 a plurality of first connecting portions to which the plurality of second supporting members are connected to overlap;
 a plurality of second connecting portions positioned between the plurality of first connecting portions; and
 openings formed in second support surfaces of the second connecting portions, and
wherein the plurality of reinforcing members are disposed to overlap the second connecting portions.

17. The reinforcing structure of claim 16, wherein the second supporting members are formed of a material having higher rigidity than the first supporting member.

18. An electronic device, comprising:
 a first housing;
 a second housing partially movably connected to the first housing;
 a flexible display supported by the first housing and the second housing and configured to change between a first state and a second state, the first state being a state in which an area of a display area visually exposed to an outside is at a minimum and the second state being a state in which the area of the display area is at a maximum; and a reinforcing structure disposed on a rear surface of the flexible display, wherein the flexible display includes a rolling portion, a surface curvature of the rolling portion changing in a process of the flexible display changing from the first state to the second state, wherein the reinforcing structure comprises:

a support coupled to the flexible display and covering a rear surface of the rolling portion, the support comprising a first supporting member and a plurality of second supporting members connected to the first supporting member, the first supporting member including a first support surface facing the rear surface of the flexible display and a second support surface opposite to the first support surface, the plurality of second supporting members protruding in a direction of the second support surface and forming an uneven surface having a plurality of uneven areas;

a plurality of reinforcing members connected to the support, at least one reinforcing member among the plurality of reinforcing members being positioned in one recess among recesses formed on the uneven surface; and compression members connected to the reinforcing members and positioned in the recesses, and wherein, in response to the flexible display changing shape in the rolling portion that increases the surface curvature of the rolling portion of the flexible display, reinforcing members in the rolling portion among the plurality of reinforcing members change in shape as being compressed to correspond to a shape of the flexible display in the rolling portion.

* * * * *